United States Patent
Choi et al.

(10) Patent No.: US 11,818,081 B2
(45) Date of Patent: Nov. 14, 2023

(54) METHOD AND DEVICE FOR TRANSMITTING UPLINK CHANNEL, BY TERMINAL, FOR DUAL CONNECTIVITY IN WIRELESS COMMUNICATION SYSTEM

(71) Applicant: Samsung Electronics Co., Ltd., Gyeonggi-do (KR)

(72) Inventors: Seunghoon Choi, Gyeonggi-do (KR); Jinkyu Kang, Gyeonggi-do (KR); Youngbum Kim, Gyeonggi-do (KR); Taehyoung Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 308 days.

(21) Appl. No.: 17/418,397

(22) PCT Filed: Mar. 13, 2020

(86) PCT No.: PCT/KR2020/003501
§ 371 (c)(1),
(2) Date: Jun. 25, 2021

(87) PCT Pub. No.: WO2020/189968
PCT Pub. Date: Sep. 24, 2020

(65) Prior Publication Data
US 2022/0069968 A1   Mar. 3, 2022

(30) Foreign Application Priority Data
Mar. 19, 2019  (KR) .................. 10-2019-0031400

(51) Int. Cl.
*H04L 5/14* (2006.01)
*H04W 36/00* (2009.01)

(52) U.S. Cl.
CPC ....... *H04L 5/1438* (2013.01); *H04W 36/0069* (2018.08)

(58) Field of Classification Search
CPC .................. H04W 36/0069; H04L 5/1438
See application file for complete search history.

(56) References Cited

U.S. PATENT DOCUMENTS

| 9,572,799 B2 | 2/2017 | Alcouffe |
| 2013/0155915 A1* | 6/2013 | Park ..................... H04B 7/2643 370/280 |

(Continued)

FOREIGN PATENT DOCUMENTS

| KR | 10-2019-0129674 | 11/2019 | |
| WO | WO-2015020342 A1 * | 2/2015 | ........... H04L 1/1854 |
| WO | WO 2015/188886 | 12/2015 | |

OTHER PUBLICATIONS

PCT/ISA/210 Search Report issued on PCT/KR2020/003501, dated Jun. 18, 2020, pp. 5.

(Continued)

*Primary Examiner* — Jael M Ulysse
(74) *Attorney, Agent, or Firm* — The Farrell Law Firm, P.C.

(57) ABSTRACT

The present disclosure relates to a communication technique for converging IoT technology with a 5G communication system for supporting a higher data transmission rate beyond a 4G system, and a system therefor. The present disclosure may be applied to an intelligent service (for example, a smart home, a smart building, a smart city, a smart car or connected car, health care, digital education, retail business, a security and safety-related service, etc.) on the basis of 5G communication technology and IoT-related technology. The present disclosure provides a method and a device for controlling the transmit power of uplink transmission in a wireless communication system.

12 Claims, 11 Drawing Sheets

(56) References Cited

U.S. PATENT DOCUMENTS

| | | | |
|---|---|---|---|
| 2013/0322358 A1* | 12/2013 | He | H04L 1/18 370/329 |
| 2015/0208366 A1* | 7/2015 | Papasakellariou | H04W 52/146 370/311 |
| 2015/0334769 A1* | 11/2015 | Kim | H04L 1/1864 370/329 |
| 2016/0088534 A1* | 3/2016 | Axmon | H04L 5/0055 370/252 |
| 2016/0135147 A1* | 5/2016 | Ouchi | H04W 52/32 370/329 |
| 2016/0156455 A1* | 6/2016 | Park | H04W 72/0446 370/280 |
| 2016/0165547 A1* | 6/2016 | Ouchi | H04L 5/14 455/522 |
| 2016/0381680 A1* | 12/2016 | Yasukawa | H04L 5/14 370/280 |
| 2017/0048108 A1* | 2/2017 | Yi | H04L 41/0816 |
| 2017/0048803 A1* | 2/2017 | Yi | H04W 52/34 |
| 2017/0201969 A1* | 7/2017 | Park | H04L 1/1861 |
| 2018/0062796 A1 | 3/2018 | Feng et al. | |
| 2018/0092073 A1* | 3/2018 | Nogami | H04W 52/16 |
| 2018/0123744 A1* | 5/2018 | Nogami | H04W 52/248 |
| 2018/0324853 A1* | 11/2018 | Jeon | H04W 52/04 |
| 2019/0109697 A1* | 4/2019 | Lee | H04W 72/0446 |
| 2019/0363866 A1* | 11/2019 | Gaal | H04L 1/1854 |
| 2020/0221523 A1* | 7/2020 | Hosseini | H04L 5/001 |
| 2020/0413463 A1* | 12/2020 | Ouchi | H04L 5/0032 |
| 2021/0029764 A1* | 1/2021 | Chen Larsson | H04L 5/1469 |
| 2021/0218542 A1* | 7/2021 | Ohuchi | H04L 1/1861 |
| 2022/0294601 A1* | 9/2022 | Stern-Berkowitz | H04L 1/1822 |

OTHER PUBLICATIONS

PCT/ISA/237 Written Opinion issued on PCT/KR2020/003501, dated Jun. 18, 2020, pp. 3.

Huawei et al, 'Enhancements for single UL operation for EN-DC', R1-1901552, 3GPP TSG RAN WG1 Meeting #96, Athens, Greece, Feb. 16, 2019, pp. 6.

Apple Inc., 'Enhancements to single Tx switched uplink for EN-DC', R1-1902774, 3GPP TSG RAN WG1 Meeting #96, Athens, Greece, Feb. 16, 2019, pp. 10.

Qualcomm Incorporated, 'Enhancements for EN-DC Single-Tx TDM Operation', R1-1903027, 3GPP TSG RAN WG1 Meeting #96, Athens, Greece, Feb. 16, 2019, pp. 7.

* cited by examiner

METHOD AND DEVICE FOR TRANSMITTING UPLINK CHANNEL, BY TERMINAL, FOR DUAL CONNECTIVITY IN WIRELESS COMMUNICATION SYSTEM

PRIORITY

This application is a National Phase Entry of PCT International Application No. PCT/KR2020/003501 which was filed on Mar. 13, 2020, and claims priority to Korean Patent Application No. 10-2019-0031400, which was filed on Mar. 19, 2019, the content of each of which is incorporated herein by reference.

TECHNICAL FIELD

The disclosure relates to an uplink channel transmission method and apparatus for a dual connectivity terminal in a wireless communication system.

BACKGROUND ART

To meet the demand for wireless data traffic having increased since deployment of 4G communication systems, efforts have been made to develop an improved 5G or pro-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IOT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

Accordingly, various attempts have been made to apply a 5G communication system to an IoT network. For example, 5G communication technology, such as a sensor network, machine-to-machine communication(M2M), and machine-type communication (MTC), is implemented by techniques such as beamforming, MIMO, and array antenna. The application of a cloud radio access network(cloud RAN) as big-data processing technology described above is an example obtained by converging 5G technology and IoT technology.

Meanwhile, various studies are being conducted on the transmission scheme of the uplink control channel in a communication system, and in particular, methods for transmitting the physical uplink control channel (PUCCH) and the physical uplink shared channel (PUSCH) are being discussed from various viewpoints.

DISCLOSURE OF INVENTION

Technical Problem

A terminal capable of dual connectivity (DC) to LTE and NR can transmit and receive data for each of the LTE cell and NR cell. A terminal having a dynamic power sharing capability for uplink transmission is not restricted in LTE uplink transmission and NR uplink transmission at a specific subframe or slot. Meanwhile, when LTE uplink transmission and NR uplink transmission collide in time, a method for determining which uplink transmission to be performed first by the terminal is disclosed below.

In addition, a terminal having a semi-static power sharing capability for uplink transmission performs LTE uplink transmission and NR uplink transmission in a time-division manner. Here, the terminal receives a first configuration that allows the terminal to perform uplink transmission only in a specific subframe for the LTE cell, and is restricted to transmit HARQ-ACK for downlink data only in the specific subframe according to the first configuration. When the terminal having the semi-static power sharing capability transmits uplink data, the location of the subframe in which the terminal performs initial transmission and retransmission may be the same or different for each radio frame according to the time division duplex (TDD) uplink (UL)-downlink (DL) configuration of the LTE cell. Accordingly, there is provided a method for performing initial transmission and retransmission of LTE uplink data only in a specific subframe restricted according to the first configuration by applying a second configuration varying according to the TDD UL-DL configuration of the LTE cell.

Solution to Problem

According to an embodiment of the disclosure, a method performed by a terminal is provided. The method comprises: obtaining a time division duplex (TDD) uplink (UL)-downlink (DL) configuration for a primary cell(PCell) of a master cell group (MCG) supported by the master base station; obtaining a first reference TDD configuration for determining an uplink transmission timing; determining a second reference TDD configuration based on the TDD UL-DL configuration and the first reference TDD configuration; and transmitting an uplink signal to at least one of the master base station or the secondary base station according to the second reference TDD configuration.

According to an embodiment of the disclosure, a method performed by a master base station is provided. The method comprises: transmitting, to a terminal, the terminal a time division duplex (TDD) uplink (UL)-downlink (DL) configuration for a primary cell(PCell) of a master cell group (MCG) supported by the master base station; transmitting a first reference TDD configuration for determining an uplink transmission timing to the terminal; and receiving an uplink signal from the terminal according to a second reference TDD configuration determined based on the TDD UL-DL configuration and the first reference TDD configuration.

According to an embodiment of the disclosure, a terminal is provided. The terminal comprises: a transceiver configured to transmit and receive signals; and a controller configured to obtain a time division duplex (TDD) uplink (UL)-downlink (DL) configuration for a primary cell (PCell) of a master cell group (MCG) supported by the master base station, obtain a first reference TDD configuration for determining an uplink transmission timing, determine a second reference TDD configuration based on the TDD UL-DL configuration and the first reference TDD configuration, and transmit an uplink signal to at least one of the master base station or the secondary base station according to the second reference TDD configuration.

According to an embodiment of the disclosure, a master base station is provided. The master base station comprises: a transceiver configured to transmit and receive signals; and a controller configured to transmit the terminal a time division duplex (TDD) uplink (UL)-downlink (DL) configuration for a primary cell (PCell) of a master cell group (MCG) supported by the master base station, transmit the terminal a first reference TDD configuration for determining an uplink transmission timing, and receive an uplink signal from the terminal according to a second reference TDD configuration determined based on the TDD UL-DL configuration and the first reference TDD configuration.

Advantageous Effects of Invention

The efficiency of a process in which a terminal capable of dual connectivity to an LTE cell and an NR cell transmits and receives an uplink signal is improved, enabling stable signal transmission and reception.

MODE FOR THE INVENTION

Figure 1:
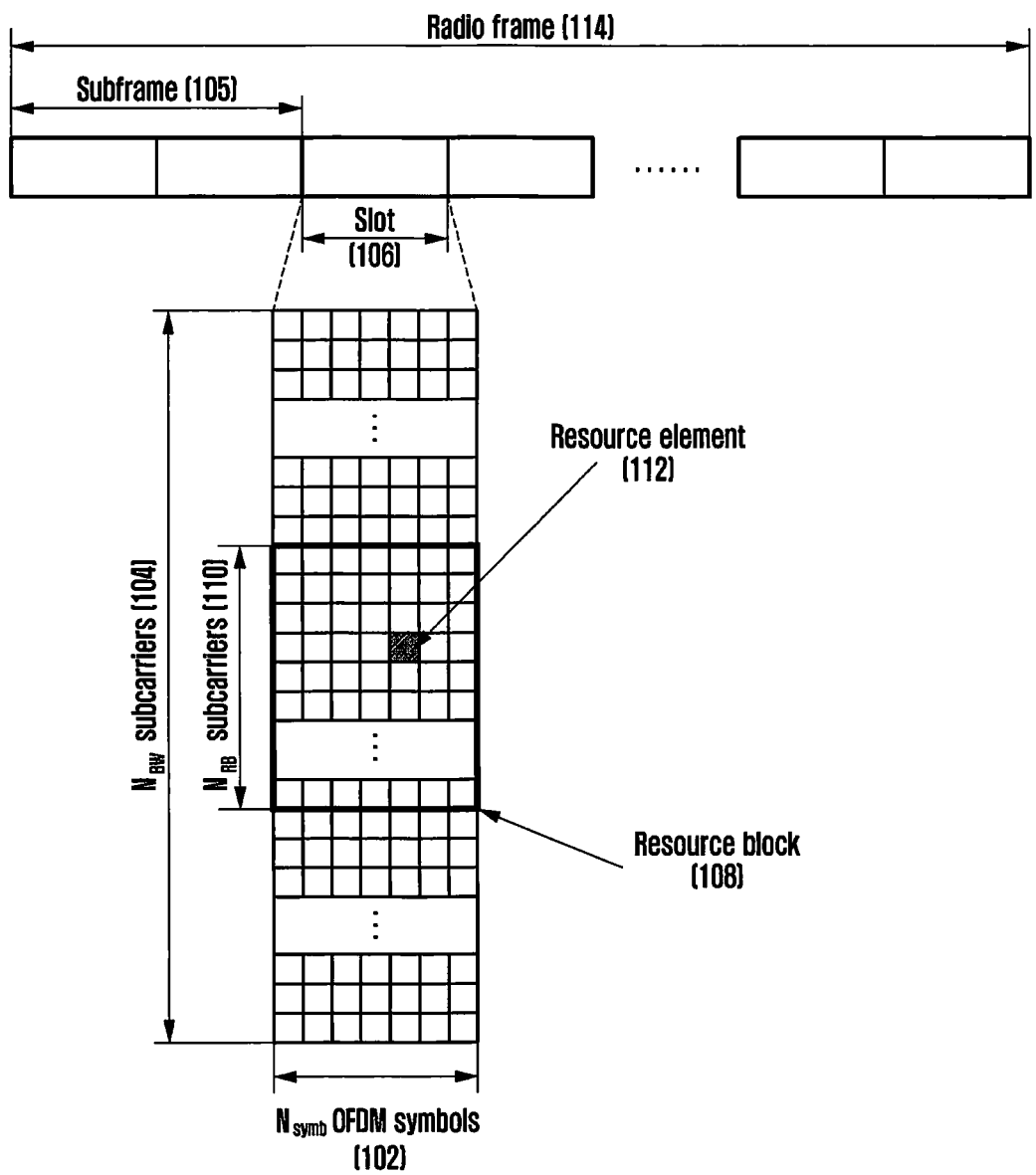
FIG. 1 is a diagram showing a basic structure of the time-frequency domain in an LTE system.

Hereinafter, embodiments will be described in detail with reference to the accompanying drawings. In describing the disclosure below, a detailed description of related known configurations or functions incorporated herein will be omitted if it is determined that the detailed description may unnecessarily obscure the subject matter of the disclosure. The terms used below are terms defined in consideration of the functions in the disclosure, and may differ according to users or operators' intentions or customs. Therefore, the definitions of the terms should be made based on the contents throughout the specification.

The advantages and features of the disclosure and ways to achieve the same will be made apparent by making reference to the embodiments described below in detail in conjunction with the accompanying drawings. However, the disclosure is not limited to the embodiments set forth below, and may be implemented in various different forms. The following embodiments are provided only to completely explain the disclosure and inform those skilled in the art of the scope of the disclosure, and the disclosure is defined only by the scope of the appended claims. Through out the specification, the same or like reference numerals designate the same or like elements.

Here, it will be understood that each block in the flowchart illustrations, and combinations of blocks in the flowchart illustrations, can be implemented by computer program instructions. These computer program instructions can be provided to a processor of a general-purpose computer, special-purpose computer, or other programmable data processing apparat us to produce a machine, such that the instructions, which execute via the processor of the computer or other programmable data processing apparatus, create means for implementing the functions specified in the flow chart block or blocks. These computer program instructions may also be stored in a computer-usable or computer-readable memory that can direct a computer or other programmable data processing apparatus to function in a particular manner such that the instructions stored in the computer-usable or computer-readable memory produce an article of manufacture including instruction means that implement the function specified in the flowchart block or blocks. The computer program instructions may also be loaded onto a computer or other programmable data-processing apparatus to cause a series of operations to be performed on the computer or other programmable data-processing apparatus to produce a computer-implemented process such that the instructions that execute on the computer or other programmable data-processing apparatus provide operations for implementing the functions specified in the flowchart block or blocks.

Each block of the flowchart illustrations may represent a module, segment, or portion of code, which includes one or more executable instructions for implementing the specified logical function(s). It should also be noted that in some alternative implementations, the functions noted in the blocks may occur out of the order shown. For example, two blocks shown in succession may in fact be executed substantially concurrently or the blocks may sometimes be executed in the reverse order, depending upon the functionality involved.

As used herein, the term "unit" refers to a software element or a hardware element, such as a FPGA or an ASIC, which performs a predetermined function. However, "unit" does not always have a meaning limited to software or hardware. The "unit" may be constructed either to be stored in an addressable storage medium or to be executed on one or more processors. Therefore, the "unit" includes, for example, software elements, object-oriented software elements, class elements or task elements, processes, functions, properties, procedures, sub-routines, segments of program code, drivers, firmware, micro-codes, circuits, data, database, data structures, tables, arrays, and parameters. The elements and functions provided by the "unit" may be combined into a smaller number of elements or "units", or may be divided into a larger number of elements or "units". Moreover, the elements and "units" may be implemented to be reproduced one or more CPUs within a device or a security multimedia card.

Hereinafter, the embodiments will be described in detail with reference to the accompanying drawings. In describing the disclosure below, a detailed description of related known configurations or functions incorporate d herein will be omitted if it is determined that the detailed description thereof would unnecessarily obscure the subject matter of the disclosure. The terms used below are terms defined in consideration of the functions in the disclosure, and may differ according to a user or operator's intentions or customs. Therefore, the definitions of the terms should be made based on the content throughout the specification.

Further, in describing embodiments in detail, the disclosure will be directed to an OFDM-based wireless communication system, particularly the 3GPP EUTRA standard, but it will be understood by those skilled in the art that the main gist of the disclosure may also be applied to other communication systems having similar technical backgrounds and channel formats, with slight modification, without substantially departing from the scope of the disclosure.

Meanwhile, research on the coexistence of the new 5G communication (or NR communication in the disclosure) and the existing LTE communication in the same spectrum is underway in the mobile communication system.

The disclosure relates to a wireless communication system, and more particularly, to a method and an apparatus for transmitting or receiving data to or from each communication system by a terminal, wherein different wireless communication systems coexist in one carrier frequency or a plurality of carrier frequencies and data transmission or reception can be performed in at least one communication system among different communication systems.

Generally, a mobile communication system has been developed to provide voice service while ensuring a user's mobility. However, the mobile communication system is gradually expanding from voice to include data service, and has now developed to the extent of providing high-speed data service. However, mobile communication systems currently providing service simultaneously face a lack of resources and user demand for higher-speed services, and therefore a more advanced mobile communication system is required.

As a system under development in the next generation mobile communication system in response to this demand, development of a long-term evolution (LTE) standard is underway in the 3rd-generation partnership project (3GPP). LTE is a technology that implements high-speed packet-based communications with transmission rates of up to 100 Mbps. To this end, various methods are discussed, for example, a method for reducing the number of nodes located on a communication path by simplifying the structure of a network, and a method for making wireless protocols as closer to a wireless channel as possible.

The LTE system adopts a hybrid automatic repeat request (HARQ) meth od in which corresponding data is retransmitted in a physical layer if de coding failure occurs upon an initial transmission. In the HARQ method, if a receiver fails to correctly decode data, a receiver transmits information indicating decoding failure (negative acknowledgment: NACK) to a transmitter so as to enable the transmitter to retransmit the corresponding data in the physical layer. The receiver combines the data, retransmitted by the transmitter, with existing data, decoding of which failed, an d thereby improving data reception performance. In addition, if data de coding is successful, the receiver may transmit information (acknowledgement (ACK)) indicating that decoding is successful to the transmitter so as to enable the transmitter to transmit new data.

FIG. 1 illustrates the basic structure of a time-frequency domain, which is a radio resource domain in which data or a control channel is transmitted in a downlink of an LTE system.

Referring to FIG. 1, the horizontal axis indicates a time domain, and the vertical axis indicates a frequency domain. The minimum transmission unit in the time domain is an OFDM symbol, and Nsymb OFDM symbols 102 may be collected to configure one slot 106, and two slots configure one subframe 105. The length of the slot is 0.5 ms and the length of the subframe is 1.0 ms. The radio frame 114 is a time-domain unit configured by 10 subframes. The minimum transmission unit in the frequency domain is a subcarrier, and the total system transmission bandwidth is configured by a total of NBW 104 subcarriers.

The basic unit of the time-frequency domain is a resource element (RE) 112, and the RE may be represented by an OFDM symbol index and a subcarrier index. A resource block (RB or physical resource block (PRB)) 108 is defined by Nsymb consecutive OFDM symbols 102 in the dime domain and NRB consecutive subcarriers 110 in the frequency domain. Thus, one RB 108 is configured by Nsymb x NRB REs 112. In general, the minimum tranmission unit of data is the RB unit. In the LTE system, Nsymb is 7, NRB is 12, and NBW and NRB are generally proportional to the bandwidth of the system transmission band. The data rate increases in proportion to the number of RBs scheduled to a UE. The LTE system defines and operates six transmission bandwidths. In the case of an FDD system in which the downlink and the uplink are classified by frequency, the downlink transmission bandwidth and the uplink transmission bandwidth may be different from each other. The channel bandwidth represents the RF bandwidth, corresponding to the system transmission bandwidth. <Table 1> shows the correspondence between system transmission bandwidth and channel bandwidth defined in the LTE system. For example, an LTE system having a 10 MHz channel bandwidth includes a transmission bandwidth of 50 RBs.

TABLE 1

| Channel bandwidth $BW_{channel}$ [MHz] | 1.4 | 3 | 5 | 10 | 15 | 20 |
|---|---|---|---|---|---|---|
| Transmission bandwidth configuration | 6 | 15 | 25 | 50 | 75 | 100 |

Downlink control information is transmitted within the first N OFDM symbols in the subframe. In general, N={1, 2, 3}. Therefore, the value of N varies according to each subframe according to the amount of control information to be transmitted in the current subframe. The control information includes a control channel transmission interval indicator, indicating the number of OFDM symbols via which control information is transmitted, scheduling information for downlink data or uplink data, and an HARQ ACK/NACK signal.

In the LTE system, scheduling information for downlink data or uplink data is transmitted from a base station to a UE through downlink control information (DCI). An uplink (UL) refers to a radio link through which a UE transmits data or control signals to a base station, and a downlink (DL) refers to a radio link through which a base station transmits data or control signals to a terminal. The DCI is defined in various formats, and a DCI format may be determined and applied for operation based on whether scheduling information is for uplink data (UL grant) or for downlink data (DL grant), whether the DCI is compact DCI having a small amount of control information, whether or not spatial multiplexing using multiple antennas is applied, whether the DCI is DCI for power control, and the like. For example, DCI format 1, corresponding to scheduling control information about downlink data (DL grant), may be configured to include at least the following pieces of control information.

Resource allocation type 0/1 flag: indicates whether the resource allocation method is type 0 or type 1. Type 0 allocates resources in units of resource blockgroup (RBG) by applying a bitmap method. In the LTE system, the basic unit of scheduling is a resource block (RB), represented by time- and frequency-domain resources, and the RBG is configured as a plurality of RBs and serves as a basic unit of scheduling in the type 0 method. Type 1 allows a specific RB to be allocated within the RBG.

Resource block assignment: indicates the RB allocated to data transmission. The resources to be represented are determined according to the system bandwidth and the resource allocation method.

Modulation and coding method (MCS): indicates the modulation method used for data transmission and the size of the transport block, which is the data to be transmitted.

HARQ process number: indicates the HARQ process number.

New data indicator: indicates HARQ initial transmission or retransmission.

Redundancy version: indicates the redundancy version of HARQ.

Transmit power control (TCP) command for physical uplink control channel (PUCCH): indicates a transmission power control command for a PUCCH, which is an uplink control channel.

The DCI is transmitted through a physical downlink control channel (PDCCH) or an enhanced PDCCH (EPDCCH) through a channel coding and modulation process.

Generally, the DCI is independently channel-coded for each UE, and is then configured and transmitted as an independent PDCCH. The PDCCH is mapped and transmitted during the control channel transmission interval in the time domain. The location of the frequency domain to which the PDCCH is mapped is determined by the identifier (ID) of each UE and is propagated to (distributed over) the entire system transmission band.

Downlink data is transmitted through a physical downlink shared channel (PDSCH), which is a physical channel for downlink data transmission. The PDSCH is transmitted after the control channel transmission interval. The scheduling information, such as the specific mapping location and modulation method in the frequency domain is indicated by DCI transmitted through the PDCCH.

Via an MCS, which is configured by 5 bits of the control information included in the DCI, the base station notifies the UE of the modulation method applied to the PDSCH and the size of data to be transmitted (transport block size (TBS)). The TBS corresponds to the size before channel coding for error correction is applied to data (transport block, TB) to be transmitted by the base station.

The modulation methods supported by the LTE system are quadrature phase-shift keying (QPSK), 16 quadrature amplitude modulation (QAM) and 64QAM, the modulation orders (Qm) of which correspond to 2, 4, and 6, respectively. That is, in the case of QPSK modulation, 2 bits are transmitted per symbol. In the case of 16 QAM modulation, 4 bits are transmitted per symbol. In the case of 64 QAM modulation, 6 bits are transmitted per symbol.

Unlike LTE Rel-8, 3GPP LTE Rel-10 adopted a bandwidth extension technology in order to support transmission of a larger amount of data. Technology called bandwidth extension or carrier aggregation (CA) may expand the band and thus increase the amount of data transmission through the expanded band compared to an LTE Rel-8 terminal which transmits data in one band. Each of the bands is called a component carrier (CC), and the LTE Rel-8 terminal is defined to have one component carrier for each of the downlink and the uplink. Further, a group of uplink component carriers connected to downlink component carriers through SIB-2 is called a cell. An SIB-2 connection relationship between the downlink component carriers and the uplink component carriers is transmitted through a system signal or a higher-layer signal. The terminal supporting CA may receive downlink data through a plurality of serving cells and transmit uplink data.

In LTE Rel-10, if a base station has difficulty transmitting a physical downlink control channel (PDCCH) to a specific UE in a specific serving cell, the base station may transmit a PDCCH in another serving cell and configure a carrier indicator field (CIF) as a field indicating that the corresponding PDCCH is a physical downlink shared channel (PDSCH) or a physical uplink shared channel (PUSCH) of the another serving cell. The CIF may be configured in the terminal supporting CA. The CIF may be determined to indicate another serving cell by adding 3 bits to the PDCCH information in a specific serving cell, and the CIF is included only in the case where a higher-layer signal is configured to perform cross-carrier scheduling. If a higher-layer signal is not configured to perform cross-carrier scheduling but is configured to perform self-scheduling, the CIF is not included, in which case cross-carrier scheduling is not performed. If the CIF is included in the downlink assignment information (DL assignment), the CIF is defined to indicate a serving cell to which a PDSCH to be scheduled by the DL assignment is transmitted. If the CIF is included in the uplink resource allocation information (UL grant), the CIF is defined to indicate the serving cell to which the PUSCH scheduled by the UL grant is transmitted.

As described above, in LTE Rel-10, carrier aggregation (CA), which is a bandwidth expansion technology, is defined, and thus a plurality of serving cells may be configured in the UE. The UE periodically or aperiodically transmits channel information about a plurality of serving cells to the base station in order to perform data scheduling of the base station. The base station schedules and transmits data for each carrier, and the terminal transmits A/N feedback of data transmitted for each carrier. LTE Rel-10 is designed to transmit a maximum of 21 bits of A/N feedback and if transmission of A/N feedback and transmission of channel information overlap in one subframe, LTE Rel-10 is designed to transmit the A/N feedback and discard the channel information. LTE Rel-11 is designed to multiplex A/N feedback and channel information of one cell and transmit A/N feedback corresponding to the maximum of 22 bits and the channel information of one cell in transmission resources of PUCCH format 3 via PUCCH format 3.

In LTE Rel-13, a maximum of 32 serving-cell configuration scenarios are assumed. LTE-Rel 13 conceptually includes expanding the number of serving cells up to a maximum of 32 serving cells not only through a licensed band but also through an unlicensed band. Further, LTE Rel-13 includes provision of LTE service in an unlicensed band, such as a band of 5 GHz, in consideration of limitation of the number of licensed bands such as the LTE frequency, which is called licensed assisted access (LAA). LAA applies a carrier aggregation technology of LTE to support operation of the LTE cell, corresponding to the licensed cell, as a primary cell (PCell) and the LAA cell, corresponding to the unlicensed band, as a secondary cell (SCell). Accordingly, as in LTE, feedback generated in the LAA cell corresponding to the SCell should be transmitted only in the PCell, and the LAA cell may freely apply a downlink subframe and an uplink subframe. Unless specially mentioned in this specification, LTE refers to all technologies evolved from LTE such as LTE-A and LAA.

In general, a TDD communication system uses a common frequency for the downlink and the uplink, but separates transmission and reception of the uplink signal and the downlink signal in the time domain. In LTE TDD, uplink or downlink signals are divided and transmitted for each subframe. Subframes for uplink and downlink may be divided equally in the time domain according to the traffic load of the uplink and downlink and operated, more subframes may be allocated to the downlink and operated, or more subframes may be allocated to the uplink and operated. In LTE, the length of the subframe is 1 ms, and 10 subframes are gathered to form one radio frame.

TABLE 2

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

<Table 2> shows a TDD uplink-downlink (UL-DL) configuration defined in LTE. In <Table 1>, "D" denotes a subframe configured for downlink transmission, "U" denotes a subframe configured for uplink transmission, and "S" denotes a special subframe configured by a downlink pilot time slot (DwPTS), a guard period (GP), and an uplink pilot time slot (UpPTS). In the DwPTS, control information can be transmitted to the downlink, as in a general subframe. If the length of the DwPTS is long enough according to the configuration state of the special subframe, downlink data transmission is also possible. The GP is a period for accepting transition of a transmission state from the downlink to the uplink, and the length of the GP is determined according to the network configuration and the like. The UpPTS is used for sounding reference signal (SRS) transmission of a UE, necessary for estimating the uplink channel state, or random access channel (RACH)transmission of the UE for random access.

For example, in TDD UL-DL configuration #6, downlink data and downlink control information can be transmitted to subframes #0, #5 and #9, and uplink data and uplink control information can be transmitted to subframes #2, #3, #4, #7, and #8. In subframes #1 and #6, which are special subframes, the downlink control information and the downlink data can be transmitted according to the case, and the SRS or RACH can be transmitted to the uplink.

In a TDD system, since the downlink or uplink signal transmission is allowed only during a specific time interval, it is necessary to define a specific timing relationship between related uplink and downlink physical channels, such as a control channel for data scheduling, a scheduled data channel, and an HARQ ACK/NACK (or HARQ-ACK) channel corresponding to a data channel.

First, in the LTE TDD system, the uplink/downlink timing relationship between a physical uplink shared channel (PDSCH), which is a physical channel for downlink data transmission, and a corresponding physical uplink control channel (PUCCH) or physical uplink shard channel (PUSCH), which is a physical channel through which uplink HARQ ACK/NACK is transmitted, is as follows.

If the UE receives the PDSCH transmitted to the subframe (n-k) from a base station, the UE transmits the uplink HARQ ACK/NACK for the PDSCH to the uplink subframe n. Here, k is an element of the set K, and K is as defined in <Table 3>.

TABLE 3

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

<Table 4> shows the subframe through which a corresponding uplink HARQ ACK/NACK is transmitted, in the case where a PDSCH is transmitted in each downlink subframe (D) or a special subframe (S) n in each TDD UL-DL configuration, and it is rearranged according to the definition of <Table 3>.

TABLE 4

| UL-DL Configuration | \multicolumn{10}{c}{Subframe n} |
| --- | --- | --- | --- | --- | --- | --- | --- | --- | --- | --- |
| | 0 | 1 | 2 | 3 | 4 | 5 | 6 | 7 | 8 | 9 |
| 0 | D₄ | S₆ | U | U | U | D₄ | S₆ | U | U | U |
| 1 | D₇ | S₆ | U | U | D₄ | D | S₇ | U₆ | U | D₄ |
| 2 | D₇ | S₆ | U | D₄ | D₈ | D₇ | S₆ | U | D₄ | D₈ |
| 3 | D₄ | S₁₁ | U | U | U | D₇ | D₆ | D₆ | D₅ | D₅ |
| 4 | D₁₂ | S₁₁ | U | U | D₈ | D₇ | D₇ | D₆ | D₅ | D₄ |
| 5 | D₁₂ | S₁₁ | U | D₉ | D₈ | D₇ | D₆ | D₅ | D₄ | D₁₃ |
| 6 | D₇ | S₇ | U | U | U | D₇ | S₇ | U | U | D₅ |

Figure 2:
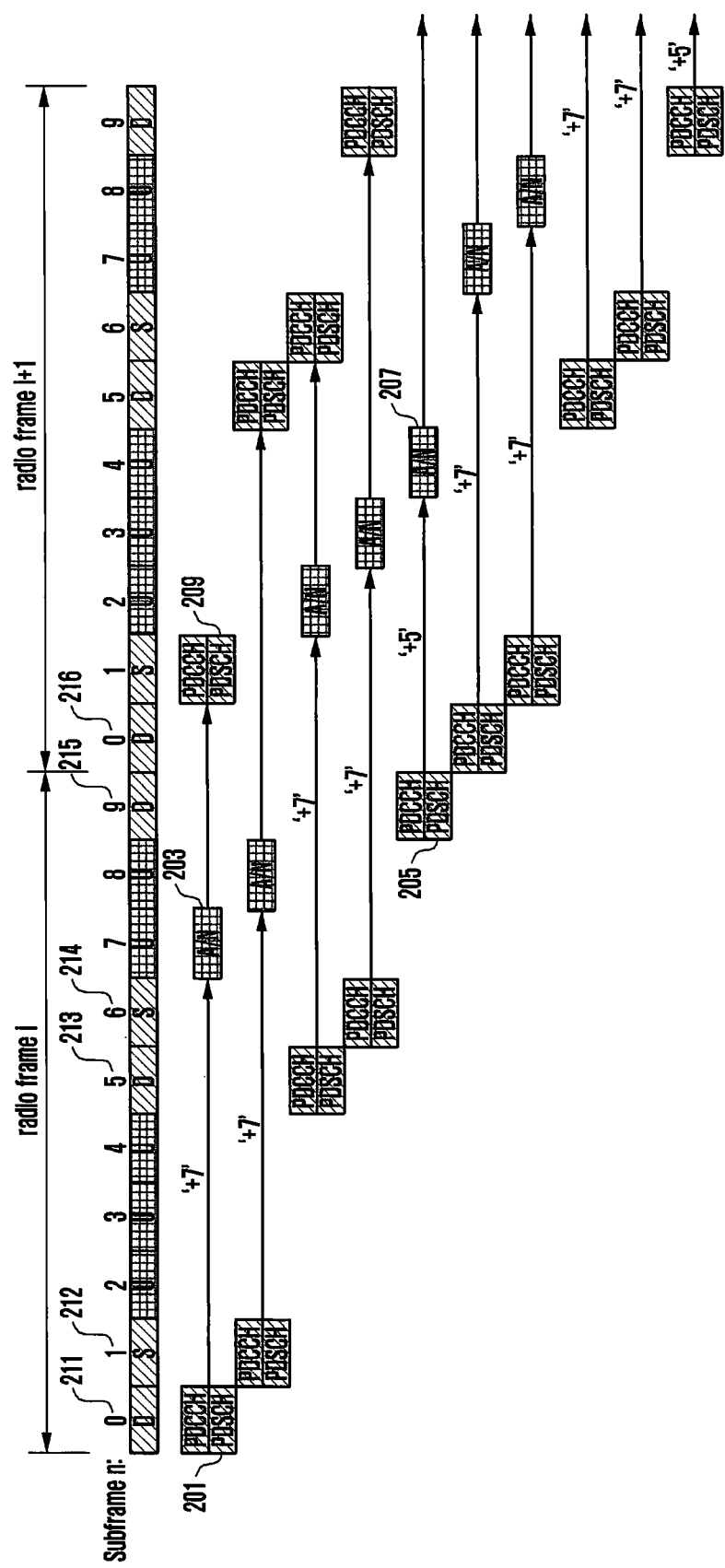
FIG. 2 is a diagram illustrating a usage example of a subframe in a normal LTE TDD frame.

FIG. 2 illustrates an operation example of a subframe in a TDD frame.

<Table 4> shown above is described with reference to FIG. 2 below. Here, FIG. 2 exemplarily illustrates the subframe through which a corresponding uplink HARQ ACK/NACK is transmitted, according to the definition of <Table 4>, in the case where a PDSCH is transmitted to each downlink subframe or a special subframe in each TDD UL-DL configuration #6 of <Table 4>.

For example, the uplink HARQ ACK/NACK corresponding to a PDSCH 201, which is transmitted to subframe #0 of radio frame i by a base station, is transmitted to subframe #7 of radio frame i by a UE (indicated by reference numeral 203). At this time, downlink control information (DCI) including scheduling information for the PDSCH 201 is transmitted through a PDCCH to the same subframe as the subframe to which the PDSCH is transmitted. As another example, the uplink HARQ ACK/NACK corresponding to PDSCH 205, which is transmitted by the base station in subframe #9 of radio frame i, is transmitted by the UE in subframe #4 of radio frame i+1 (indicated by reference numeral 207). Similarly, downlink control information (DCI) including scheduling information for the PDSCH 205 is transmitted through the PDCCH to the same subframe as the subframe to which the PDSCH is transmitted.

In the LTE system, downlink HARQ adopts an asynchronous HARQ method in which the data retransmission time is not fixed. That is, if NACK feedback with respect to HARQ data initially transmitted by the base station is provided from the UE, the base station freely determines the transmission time for the next HARQ data retransmission attempt through a scheduling operation. The UE buffers HARQ data, which is determined to be an error as a result of decoding the received data for the HARQ operation, and then combines the HARQ data with subsequently retransmitted HARQ data. At this time, in order to maintain the reception buffer capacity of the UE within a predetermined limit, the maximum number of downlink HARQ processes for each TDD UL-DL configuration is defined as shown in <Table 5>. One HARQ process is mapped to one subframe in the time domain.

TABLE 5

| TDD UL/DL configuration | Maximum number of HARQ processes |
| --- | --- |
| 0 | 4 |
| 1 | 7 |
| 2 | 10 |
| 3 | 9 |
| 4 | 12 |
| 5 | 15 |
| 6 | 6 |

Referring to the example of FIG. 2, the UE decodes the PDSCH 201 transmitted to subframe #0 of radio frame i by the base station, and if it is determined to be an error, the UE transmits NACK to subframe #7 of radio frame i (indicated by reference numeral 203). Upon receiving the NACK, the base station configures the retransmission data for the PDSCH 201 as the PDSCH 209 and transmits the PDSCH together with the PDCCH. FIG. 2 exemplifies the case where the retransmission data is transmitted to subframe #1 of radio frame i+1 by considering that the maximum number of downlink HARQ processes of TDD UL-DL configuration #6 is 6 according to the definition of <Table 5>. That is, there are a total of 6 downlink HARQ processes 211, 212, 213, 214, 215, and 216 between the initial transmission PDSCH 201 and the retransmission PDSCH 209.

Unlike the downlink HARQ in the LTE system, the uplink HARQ adopts a synchronous HARQ method having a fixed data transmission time point. That is, the uplink/downlink timing relationship between a physical uplink shared channel (PUSCH), which is a physical channel for uplink data transmission, and a physical hybrid indicator channel (PHICH), which is a physical channel through which a downlink HARQ ACK/NACK corresponding to the PUSCH is transmitted, is fixed by the following rules.

When the UE receives the PDCCH including the uplink scheduling control information transmitted to the subframe n by the base station or the PHICH through which the downlink HARQ ACK/NACK is transmitted, the UE transmits uplink data corresponding to the control information to the subframe (n+k) through PUSCH. Here, k is as defined in <Table 6>.

TABLE 6

| TDD UL/DL Configuration | \multicolumn{10}{c}{DL subframe number n} |
| --- | --- | --- | --- | --- | --- | --- | --- | --- | --- | --- |
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | | 7 | 7 | | 5 |

Further, if the UE receives PHICH transferring the downlink HARQ ACK/NACK to the subframe i from the base station, the PHICH corresponds to the PUSCH, which is transmitted to a subframe (i−k) by the UE. Here, k is as defined in <Table 7>.

TABLE 7

| TDD UL/DL Configuration | DL subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | | 7 | 4 | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | 7 | 4 | | | 6 |

Figure 3:
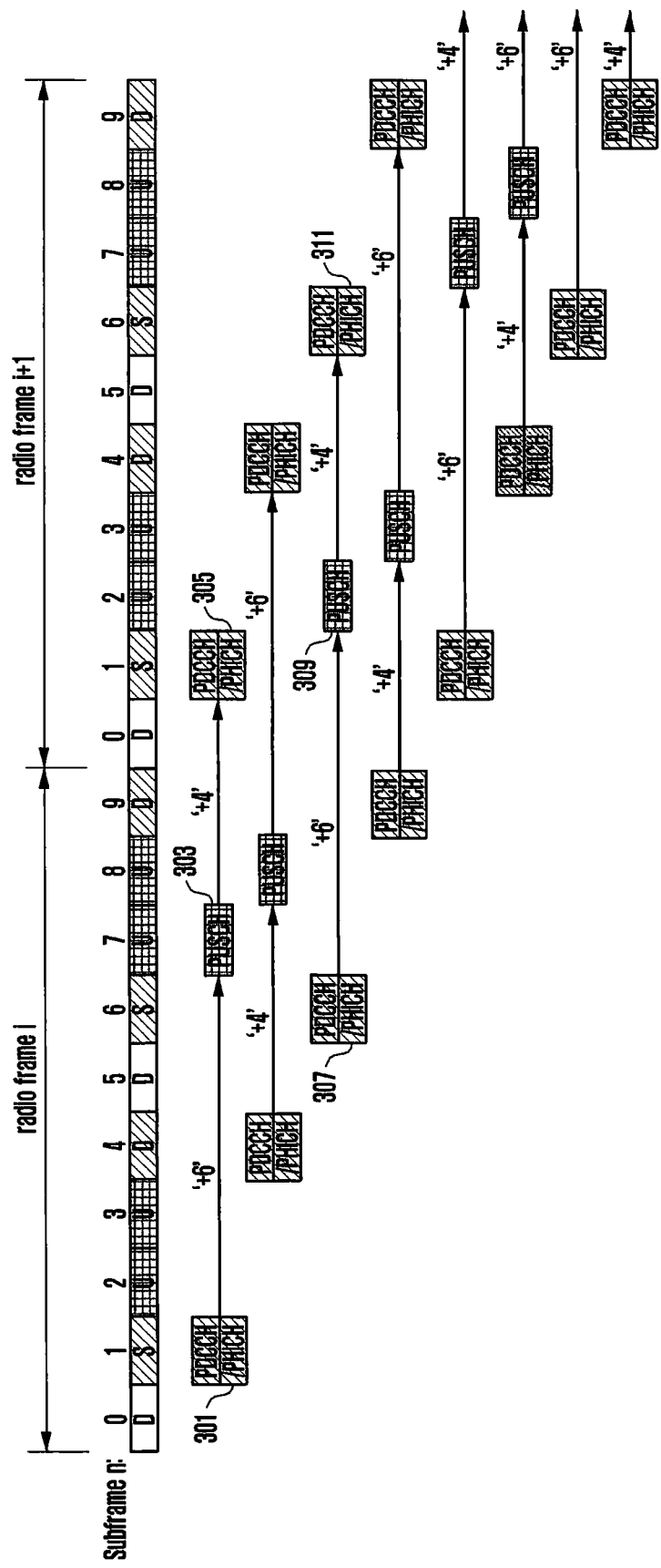
FIG. 3 is a diagram illustrating another usage example of a subframe in a normal LTE TDD frame.

FIG. 3 illustrates another operation example of a subframe in a TDD fame.

Particularly, in FIG. 3, in the case of TDD UL-DL configuration #1, if a PDCCH or a PHICH is transmitted to each downlink or special subframe, the subframe to which the corresponding PUSCH is transmitted, and the subframe to which a PHICH corresponding to the PUSCH is transmitted are illustrated according to the definitions of <Table 6> and <Table 7>.

For example, the uplink PUSCH corresponding to the PDCCH or PHICH 301, which is transmitted to subframe #1 of radio frame i by the base station, is transmitted from subframe #7 of radio frame i by the UE (indicated by reference numeral 303). In addition, the base station transmits the PHICH or PDCCH corresponding to the PUSCH to the UE in subframe #1 of radio frame i+1 (indicated by reference numeral 305). As another example, an uplink PUSCH corresponding to the PDCCH or PHICH 307 transmitted to subframe #6 of radio frame i by the base station is transmitted to subframe #2 of radio frame i+1 by the UE (indicated by reference numeral 309). In addition, the base station transmits the PHICH or PDCCH corresponding to the PUSCH to the UE in subframe #6 of radio frame i+1 (indicated by reference numeral 311).

In the LTE TDD system, the downlink transmission of the PDCCH or the PHICH corresponding to the PUSCH is limited in the specific downlink subframe in relation to the PUSCH transmission, thereby guaranteeing the minimum transmission/reception processing time of the base station and the UE. For example, in the case of TDD UL-DL configuration #1 of FIG. 3, in subframes #0 and #5, the PDCCH for scheduling the PUSCH or the PHICH corresponding to the PUSCH is not transmitted to downlink.

On the other hand, as a post-LTE communication system, a 5th-generation wireless cellular communication system (hereinafter, referred to as "5G" or "NR" in the specification) should be capable of freely satisfying the various requirements of users and service providers, so that services that meet various requirements may be supported.

Accordingly, 5G may define various 5G services such as enhanced mobile broadband communication (hereinafter, referred to as eMBB in this specification), massive machine-type communication (hereinafter, referred to as mMTC in this specification), and ultra-reliable and low-latency communications (hereinafter, referred to as URLLC in this specification) as technology for satisfying requirements selected for 5G services, among requirements of a maximum UE transmission rate of 20 Gbps, a maximum UE speed of 500 km/h, a maximum delay time of 0.5 ms, and a UE access density of 1,000,000 UEs/km2.

For example, in order to provide eMBB in 5G, a maximum downlink UE transmission rate of 20 Gbps and a maximum uplink UE transmission rate of 10 Gbps should be provided from the viewpoint of one base station. Also, the average transmission rate that the UE actually experiences needs to be increased. In order to satisfy these requirements, improvement of transmission/reception technologies, including further improved multi-input multi-output transmission technology, is needed.

Also, in order to support application services such as those of the IoT, mMTC is under consideration in 5G. The mMTC needs to meet requirements of supporting access by massive numbers of terminals within a cell, improving coverage of the UE, increasing effective battery lifetime, and reducing the cost of the UE in order to efficiently support IoT services. The IoT is attached to various sensors and devices to provide a communication function, and thus needs to support a large number of UEs within the cell (for example, 1,000,000 UEs/km2). Further, in the mMTC, the UE is highly likely to be located in a shade area such as the basement of a building or an area that cannot be covered by the cell due to characteristics of the service, and thus mMTC requires wider coverage than the coverage provided by eMBB. The mMTC is highly likely to be configured as a cheap UE, and it is difficult to frequently change a battery of such a UE, so a long battery life time is needed.

Finally, the URLLC is cellular-based wireless communication used for a particular purpose and corresponds to a service used for remote control of a robot or a machine device, industrial automation, unmanned aerial vehicles, remote health control, and emergency notification, and thus needs to provide ultra-low-latency and ultra-reliable communication. For example, the URLLC should have a maximum delay time shorter than 0.5 ms and is also required to provide a packet error rate equal to or lower than 10-5. Therefore, for the URLLC, a transmission time interval (TTI) smaller than that of a 5G service such as eMBB should be provided, and additionally, design for allocation of wide resources in a frequency band is required.

The services under consideration in the 5th-generation wireless cellular communication system should be provided as a single framework. That is, in order to efficiently manage and control resources, it is preferable to perform control and transmission such that the services are integrated into one system rather than to independently operate the services.

Figure 4:
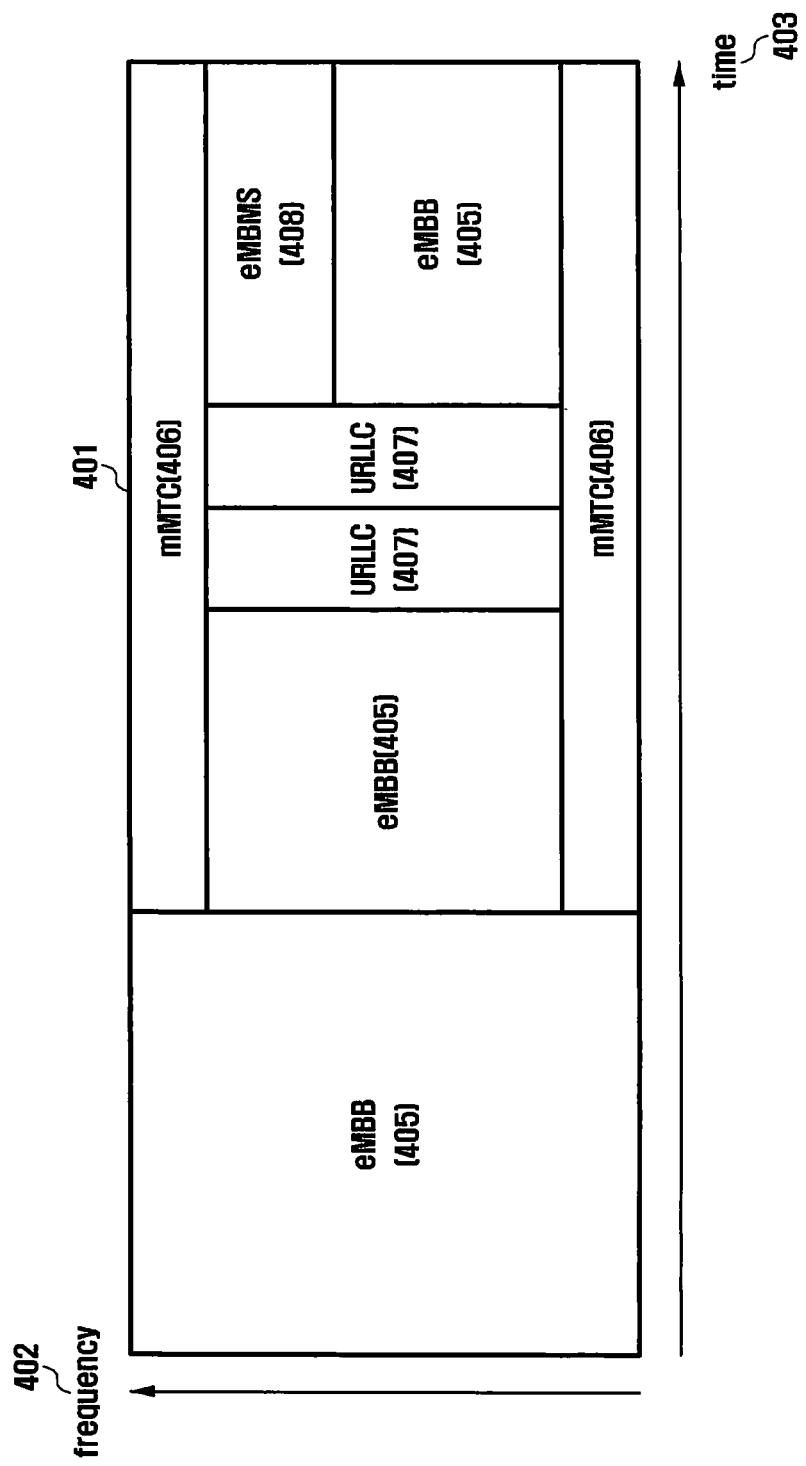
FIG. 4 is a diagram showing an example in which 5G services are multiplexed and transmitted in one system.

FIG. 4 illustrates an example in which services under consideration in 5G are transmitted to one system.

In FIG. 4, the frequency-time resources 401 used by 5G may include a frequency axis 402 and a time axis 403. FIG. 4 illustrates an example in which eMBB 405, mMTC 406, and URLLC 407 are operated within one framework. Further, as a service that can be additionally considered in 5G, an enhanced mobile broadcast/multicast service (eMBMS) 408 for providing a cellular-based broadcast service may be considered. The services under consideration for 5G, such as the eMBB 405, the mMTC 406, the URLLC 407, and the eMBMS 408, may be multiplexed through time-division multiplexing (TDM) or frequency-division multiplexing (FDM) within one system frequency bandwidth operated in 5G, and spatial-division multiplexing may also be considered. In the case of the eMBB 405, it is preferable to occupy and transmit on as large a frequency bandwidth as possible for a particular time in order to provide the increased data transmission rate which has been described in the above. Accordingly, it is preferable that the service of the eMBB 405 be time-division-multiplexed with another service within the system transmission bandwidth 401 and transmitted, but it is also preferable that the service of the eMBB be frequency-division-multiplexed (FDM) with other services within the system transmission bandwidth and transmitted according to the need of the other services.

Unlike other services, the mMTC 406 requires an increased transmission interval in order to secure wider coverage, and may secure the coverage by repeatedly transmitting the same packet within the transmission interval. Also, in order to reduce the terminal complexity and price, the transmission bandwidth within which the terminal can perform reception is limited. In the case of considering the requirements described above, it is preferable that the mMTC 406 be frequency-division multiplexed (FDM) with other services within the transmission system bandwidth 401 of 5G.

It is preferable that the URLLC 407 have a shorter transmission time interval (TTI) compared to other services in order to meet the ultra-low-latency requirement of the service. Also, in order to meet the ultra-reliable requirement, a low coding rate is needed, so it is preferable to have a wide bandwidth from the aspect of frequency. Upon considering the requirements of the URLLC 407, it is preferable that the URLLC 407 be time-division multiplexed with other services within the transmission system bandwidth 401 of 5G.

The aforementioned services may have different transmission or reception methods and transmission or reception parameters in order to meet the requirements of the services. For example, the respective services may have different numerologies depending on the requirements thereof. The numerology includes a cyclic prefix (CP) length, subcarrier spacing, an OFDM symbol length, and a transmission time interval (TTI) in an orthogonal frequency-division multiplexing (OFDM) or an orthogonal frequency division multiple access (OFDMA)-based communication system. As an example in which the services have different numerologies, the eMBMS 408 may have a longer CP than other services. Since the eMBMS transmits higher traffic based on broadcasting, the same data may be transmitted in all cells.

Here, if the signals, received by a plurality of cells, are the same as or shorter than the CP length, the UE may receive and decode all of the signals and thus obtain a single frequency network (SFN) diversity gain, and accordingly, even a UE located at a cell boundary can receive broadcasting information without any coverage restriction. However, in the case where the CP length is relatively longer than other services, in order to support the eMBMS in 5G, waste occurs due to CP overhead, and thus a longer OFDM symbol is required than in the case of other services, which results in narrower subcarrier spacing compared to other services.

Further, as an example in which different numerologies are used for services in 5G, in the case of URLLC, a shorter OFDM symbol may be required as a shorter TTI is required compared to other services, and moreover, wider subcarrier spacing may be required.

On the other hand, one TI may be defined as one slot and configured by 14 OFDM symbols or 7 OFDM symbols in 5G. Accordingly, in the case of subcarrier spacing of 15 kHz, one slot has a length of 1 ms or 0.5 ms. In 5G, one TTI may be defined as one mini-slot or sub-slot for emergency transmission and transmission in an unlicensed band, and one mini-slot may have OFDM symbols ranging from 1 to (the total number of OFDM symbols of the slot)-1. If the length of one slot corresponds to 14 OFDM symbols, the length of the mini-slot may be determined as one of 1 to 13 OFDM symbols. The length, format, or repetition form of the slot or the mini-slot may be defined according to a standard, or may be transmitted by a higher-layer signal, system information, or a physical signal, and received by the UE. In addition, instead of a mini-slot or sub-slot, the length of the slot may be determined as one of 1 to 14 OFDM symbols, and the length of the slot may be transmitted through a higher-layer signal or system information and received by the terminal.

The slot or the mini-slot may be defined to have various transmission formats, and may be classified into the following formats.

DL-only slot or full-DL slot: the DL-only slot includes only a downlink period and supports only downlink transmission.

DL-centric slot: the DL-centric slot includes a downlink period, a GP (or flexible symbol), and an uplink period, wherein the number of OFDM symbols in the downlink period is larger than the number of OFDM symbols in the uplink period.

UL-centric slot: the UL-centric slot includes a downlink period, a GP (or flexible symbol), and an uplink period, wherein the number of OFDM symbols in the downlink period is smaller than the number of OFDM symbols in the uplink period.

UL-only slot or full-UL slot: the UL-only slot includes only an uplink period and supports only uplink transmission.

In the above, only the slot formats have been classified, but the mini-slot may also be classified through the same classification method. That is, the mini-slot may be classified into a DL-only mini-slot, a DL-centric mini-slot, a UL-centric mini-slot, and a UL-only mini-slot. In the above, the flexible symbol may be used as a guard symbol for transmission or reception switching, and may also be used for the purpose of channel estimation.

Hereinafter, although the following detailed description of the embodiments will be directed to LTE and 5G, it can be understood by those skilled in the art that the main gist of the disclosure may also be applied to other communication systems having similar technical backgrounds and channel formats, with slight modification, without substantially departing from the scope of the disclosure.

In addition, in describing the embodiments of the present disclosure in detail, LTE and 5G systems will be the main targets, but the main subject of the present disclosure can be applied to other communication systems having similar technical backgrounds and channel types with slight modifications within the range that does not deviate. This is possible by the judgment of a person having skilled technical knowledge in the technical field of the present disclosure.

In order to stably support the mobility of the terminal of the existing mobile communication system while satisfying the requirements of the ultra-high speed data service and the ultra-low-latency service of the above-mentioned 5G system, it is necessary to configure an integrated system that combines a beamforming technology operating in the ultra-high frequency band, a new radio access technology (New RAT) applying a short TTI, and an LTE/LTE-A system operating in a relatively-low frequency band. In this case, the new radio access technology serves to satisfy the requirements of the 5G system, and the LTE/LTE-A system serves to stably support the mobility of the terminal.

Figure 5:
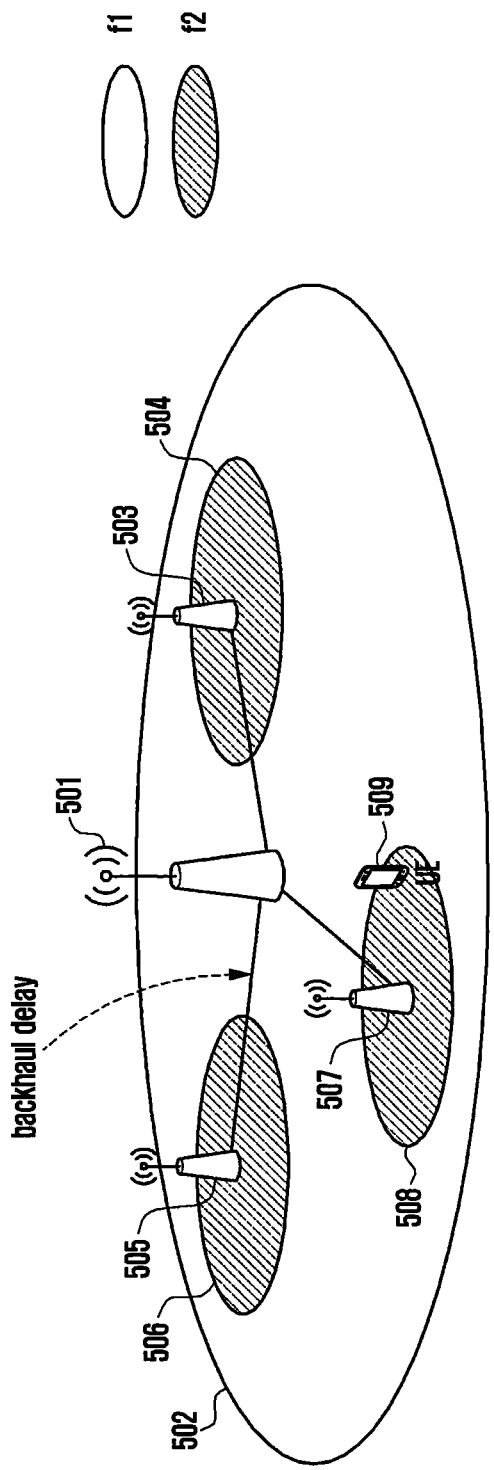
FIG. 5 is a diagram illustrating an example of a configuration of the communication system to which the disclosure is applied.

FIG. 5 is a diagram illustrating an example of a configuration of the communication system to which the disclosure is applied, and is a diagram illustrating an example of the configuration of an integrated system in which a base station in charge of the new radio access technology and an LTE/LTE-A base station are combined. With reference to FIG. 5, small base stations 503, 505 and 507 supporting relatively small coverages 504, 506 and 508 may be disposed within the coverage 502 of a macro base station 501. In general, the macro base station 501 can transmit signals with a relatively higher transmission power than the small base stations 503, 505 and 507, and the coverage 502 of the macro base station 501 is relatively larger than the coverages 504, 506 and 508 of the small base stations 503, 505 and 507. In the example of FIG. 5, the macro base station represents an LTE/LTE-A system operating in a relatively low frequency band, and the small base stations 503, 505 and 507 represent a system to which a new radio access technology (NR or 5G) operating in a relatively high frequency band is applied.

The macro base station 501 and the small base stations 503, 505 and 507 are interconnected, and a certain amount of backhaul delay may exist depending on the connection state. Hence, it may be not desirable to exchange information sensitive to transmission delay between the macro base station 501 and the small base stations 503, 505 and 507.

Meanwhile, the example of FIG. 5 illustrates carrier aggregation between the macro base station 501 and the small base stations 503, 505 and 507, but the disclosure is not limited thereto and may be applied to carrier aggregation between base stations placed at different geographical locations. For example, according to embodiments, it can be applied to carrier aggregation between a macro base station and a macro base station placed at different locations, or to carrier aggregation between a small base station and a small base station placed at different locations. In addition, the example of FIG. 5 is not limited to the number of carriers to be aggregated.

With reference to FIG. 5, the macro base station 501 may use a frequency f1 for downlink signal transmission, and the small base stations 503, 505 and 507 may use a frequency f2 for downlink signal transmission. Here, the macro base station 501 may transmit data or control information to a specific terminal 509 by use of the frequency f1, and the small base stations 503, 505 and 507 may transmit data or control information by use of the frequency f2. Through carrier aggregation as described above, a base station applying a new radio access technology capable of supporting ultra-wideband in a high-frequency band may provide an ultra-high-speed data service and an ultra-low-latency service, and a base station applying LTE/LTE—A technology in a relatively low-frequency band may support stable mobility of a terminal.

Meanwhile, the configuration illustrated in FIG. 5 is applicable not only to downlink carrier aggregation but also to uplink carrier aggregation. For example, the terminal 509 may transmit data or control information to the macro base station 501 through a frequency f1' for uplink signal transmission. In addition, the terminal 509 may transmit data or control information to the small base stations 503, 505 and 507 through a frequency f2' for uplink signal transmission. Here, f1' may correspond to f1, and f2' may correspond to f2. The uplink signal transmission of the terminal may be performed at different times or at the same time to the macro base station and the small base station. In any case, due to the physical constraints of the power amplifier element of the terminal and the radio wave regulation on the transmission power of the terminal, the sum of the uplink transmission power of the terminal at any moment must be maintained within a preset threshold.

The operation of the terminal 509 that performs communication by accessing the macro base station 501 and the small base stations 503, 505 and 507 in an environment illustrated in FIG. 5 is referred to as dual connectivity (DC). When the terminal performs dual connectivity, the following two configuration methods are possible.

First, after the terminal performs initial access to the macro base station 501 operating as an LTE/LTE-A system, it receives configuration information about data transmission/reception for the macro base station from a higher signal (system or radio resource control (RRC) signal). Then, the terminal receives configuration information about data transmission/reception for the small base stations 503, 504 and 505 operating as an NR system from a higher signal (system or RRC signal) of the macro base station 501. The terminal performs random access to the small base stations 503, 504 and 505 and enters a dual connectivity state in which data transmission and reception are possible from the macro base station 501 and the small base stations 503, 504 and 505. Here, the macro base station 501 operating as an LTE/LTE system supports a cell group called a master cell group (MCG), and the small base stations 503, 504 and 505 operating as an NR system support a cell group called a secondary cell group (SCG). This dual connectivity state of the terminal may be expressed that the terminal is configured with a MCG using E-UTRA radio access (or LTE/LTE-A) and with a SCG using NR radio access. Or, it may be expressed that the terminal is configured with EUTRA NR dual connectivity (EN-DC).

Second, after the terminal performs initial access to the small base stations 503, 504 and 505 operating as an NR system, it receives configuration information about data transmission/reception for the small base stations from a higher signal (system or RRC signal). Then, the terminal receives configuration information about data transmission/reception for the macro base station 501 operating as an LTE/LTE-A system from a higher signal (system or RRC signal) of the small base stations 503, 504 and 505, performs random access to the macro base station 501 operating as an LTE/LTE-A system, and enters a dual connectivity state in which data transmission and reception are possible from the small base stations 503, 504 and 505 and the macro base station 501. Here, the small base stations (503, 504, 505) operating as an NR system support a cell group called a MCG, and the macro base station 501 operating as an LTE system supports a cell group called a SCG. This dual connectivity state of the terminal may be expressed that the terminal is configured with a MCG using NR radio access and with a SCG using E-UTRA radio access (or LTE/LTE-A). Or, it may be expressed that the terminal is configured with NR E-UTRA dual connectivity (NE-DC).

Hereinafter, embodiments described in the disclosure will be proposed in consideration of the first dual connectivity configuration method and the second dual connectivity configuration method described above. That is, in the disclosure, different embodiments are proposed according to whether LTE cells using E-UTRA are a MCG or NR cells using NR are a MCG. This is because when the terminal is in a dual connectivity state, importance should be given to uplink transmission to the MCG rather than to uplink transmission to the SCG. In addition, while the timing for transmitting uplink transmission to a cell using NR, such as PDCCH versus PUSCH transmission timing or PDCCH versus PUCCH transmission timing, can be indicated differently according to a higher signal configuration and an indication from the PDCCH, the timing for transmitting uplink transmission to a cell using LTE (e.g., PDCCH vs. PUSCH transmission timing or PDCCH vs. PUCCH transmission timing) is fixed, so that embodiments of the disclosure will be proposed in consideration of these conditions.

The power sharing method will be described first for the case where the terminal is configured with EN-DC. That is, for the case where the terminal is configured with a MCG using E-UTRA radio access and with a SCG using NR radio access, the terminal receives a configuration for the maximum power value (or maximum transmission power value) of the uplink for LTE and the maximum power value of the uplink for NR from the LTE base station or the NR base station. Here, when the sum of the maximum power value of the uplink for LTE and the maximum power value of the uplink for NR is greater than the maximum power value for EN-DC operation, the terminal may apply one of the following two power sharing methods.

The first is semi-static power sharing between the MCG (LTE) and the SCG (NR). When the terminal receives a reference TDD configuration that restricts LTE uplink transmission only in a specific subframe for LTE uplink transmission, if the terminal does not indicate or report the capability to perform dynamic power sharing to the base station, the terminal does not expect uplink transmission in an NR slot coinciding with a time interval being an LTE uplink subframe by the reference TDD configuration (or, does not expect a configuration or scheduling indicating NR uplink transmission from the NR base station).

The second is dynamic power sharing between the MCG (LTE) and the SCG (NR). When the terminal indicates or reports the capability to perform dynamic power sharing to the base station, if LTE uplink tranmission and NR uplink transmission of the terminal collide and the sum of the power of the LTE uplink tranmission and the power of the NR uplink transmission is greater than the maximum power value for EN-DC operation, the terminal reduces the NR uplink transmission power so that the sum of the power of the LTE uplink transmission and the power of the NR uplink transmission is less than the maximum power value for EN-DC operation. When reducing the NR uplink transmission power, the terminal may drop NR transmission if the transmission power to be reduced is greater than preset value X, and the terminal performs NR uplink transmission by using the reduced transmission power if the transmission power to be reduced is less than X. Here, X is a preset threshold, and may be a value that is preconfigured in the terminal by the base station, a value fixed in advance in the terminal, or a value determined in a standard specification.

Figure 6:
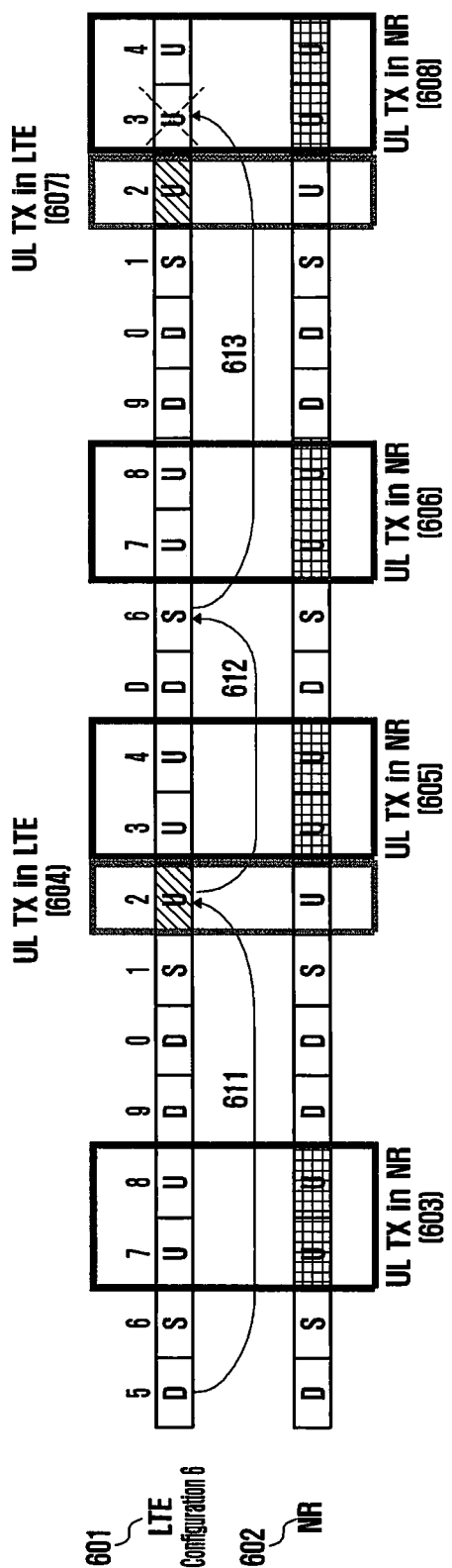
FIG. 6 is a diagram illustrating a problem situation to be solved in the disclosure.

FIG. 6 is a diagram illustrating a problem situation to be solved in the disclosure.

In FIG. 6, LTE 601 supports the MCG and operates in TDD, and NR 602 supports the SCG. Hence, it can be applied when the terminal is configured with EN-DC. In FIG. 6, the TDD cell of LTE 601 is in TDD UL-DL configuration #6, and the EN-DC terminal having received this TDD UL-DL configuration #6 from system information may be aware of the positions of the uplink subframe, special subframe, and downlink subframe. The EN-DC terminal may receive information about the position or number of uplink or downlink or flexible slots and OFDM symbols of NR 602 from system information or higher-layer information or a physical layer signal. The first problem situation will be described in consideration of the situation in which the EN-DC terminal operates in semi-static power sharing between LTE 601 and NR 602 in FIG. 6. That is, it is assumed that the EN-DC terminal receives configuration #5 for LTE uplink transmission among the reference TDD configurations (#2, #4, #5) capable of restricting LTE uplink transmission only in a specific subframe, and the EN-DC terminal does not indicate or report the capability to perform dynamic power sharing to the LTE or NR base station. In this case, it can be seen that the EN-DC terminal may perform LTE uplink transmission only in uplink subframe #2, which coincides with the uplink subframe according to reference TDD configuration #5, among uplink subframes #2, #3, #4, #7 and #8 of TDD UL-DL configuration #6 of LTE 601 received from system information (604, 607), and may perform NR uplink transmission in the NR slot that coincides with the time interval of remaining uplink subframes #3, #4, #7 and #8 (603, 605, 606, 608). These results can be determined according to Tables 3 and 4 described above.

If the EN-DC terminal follows the UL HARQ timing relationship between PDCCH transmission and PUSCH transmission defined in TDD UL-DL configuration #6 given by system information of LTE 601 for uplink data transmission (refer to Table 6 and Table 7), the EN-DC terminal performs PUSCH transmission in uplink subframe #2 for PDCCH scheduling received from the LTE base station in downlink subframe #5 of LTE 601 (611), receives ACK/NACK or PDCCH for the above PUSCH in special subframe #6 from the LTE base station (612), and transmits retransmission PUSCH for this in uplink subframe #3 (613). As the time interval corresponding to uplink subframe #3 is an interval in which only NR uplink transmission is allowed, when PUSCH retransmission described above occurs in the EN-DC terminal, there arises a problem that NR uplink transmission and LTE uplink transmission collide. Accordingly, the present disclosure provides a method for solving the above problem through Embodiments 1 and 2.

Next, the second problem situation will be described in consideration of a situation in which the EN-DC terminal operates in dynamic power sharing between LTE 601 and NR 602 in FIG. 6. That is, when the EN-DC terminal indicates or reports the capability to perform dynamic power sharing to the base station, LTE uplink transmission and NR uplink transmission of the terminal may collide, as indicated by 608 in FIG. 6, in a time interval of uplink subframe #2 in which uplink transmission is limited to LTE by the reference TDD configuration. Or, there may be a case that the sum of the power of LTE uplink transmission and the power of NR uplink transmission is greater than the maximum power value for EN-DC operation. For these cases, there is provided a method for the EN-DC terminal to solve the above problem through Embodiment 3. In addition, for the case where LTE uplink transmission and NR uplink transmission of the terminal collide as indicated by 608 in FIG. 6 in uplink subframes #3, #4, #7 and #8 being a time interval other than uplink subframe #2 being limited to LTE uplink transmission by the reference TDD configuration, or for the case where the sum of the power of LTE uplink transmission and the power of NR uplink transmission is greater than the maximum power value for EN-DC operation, there is provided a method for the EN-DC terminal to solve the above problem through Embodiment 4.

Embodiment 1

Figure 7:
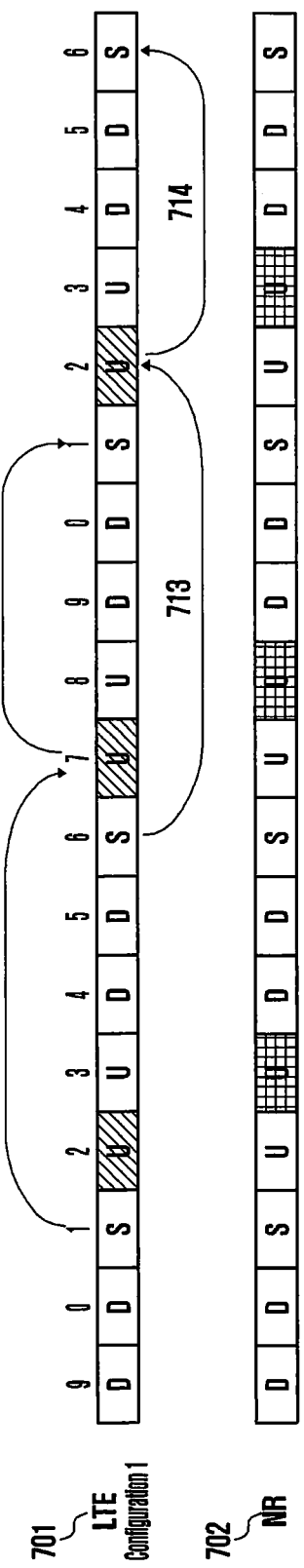
FIG. 7 is a diagram illustrating uplink transmission according to Embodiment 1 of the disclosure.

FIG. 7 is a diagram illustrating uplink transmission according to Embodiment 1 of the disclosure.

In FIG. 7, LTE 701 provides the MCG to the terminal and operates in TDD, and NR 702 provides the SCG to the terminal. Hence, it can be applied when the terminal is configured with EN-DC. In FIG. 7, the TDD cell of LTE 701 is in TDD UL-DL configuration #1, the EN-DC terminal having received this TDD UL-DL configuration #1 from system information may be aware of the positions of the uplink subframe, special subframe, and downlink subframe. The EN-DC terminal may receive information about the position or number of uplink or downlink or flexible slots and OFDM symbols of NR 702 from system information or higher-layer information or a physical layer signal. In FIG. 7, the situation where the EN-DC terminal operates in semi-static power sharing between LTE 701 and NR 702 is considered. That is, it is assumed that the EN-DC terminal receives configuration #2 for LTE uplink transmission among the reference TDD configurations (#2, #4, #5) capable of restricting LTE uplink transmission only in a specific subframe, and the EN-DC terminal does not indicate or report the capability to perform dynamic power sharing to the LTE or NR base station. In this case, it can be seen that the EN-DC terminal may perform LTE uplink transmission only in uplink subframes #2 and #7 coinciding with the uplink subframe according to reference TDD configuration #2 among uplink subframes #2, #3, #4, #7 and #8 of TDD UL-DL configuration #1 of LTE 701 received from system information, and may perform NR uplink transmission in the NR slot coinciding with the time interval of remaining uplink subframes #3 and #8. These results can be determined with reference to Tables 3 and 4 described above.

A further description is given of the case where, as described above, the TDD UL-DL configuration received from the base station of LTE 701 is one of #1, #2, #3, #4 and #5 excluding #0 and #6, and the reference TDD configuration received as a higher signal from the LTE base station or the NR base station is one of #2, #4 and #5. If the EN-DC terminal follows the TDD UL-DL configuration given by system information of LTE 701 for uplink data transmission, the UL HARQ timing relationship between PDCCH transmission and PUSCH transmission defined in TDD UL-DL configuration #1 in FIG. 7 (refer to Tables 6 and 7), as uplink subframes for PDCCH reception, PUSCH transmission, and PUSCH retransmission of the EN-DC terminal occur in the same LTE uplink subframes for every radio frame (711, 712, 713, 714), the problem of collision between NR uplink transmission and LTE uplink transmission does not arise when PUSCH retransmission of the EN-DC terminal described above occurs.

Embodiment 2

Figure 8:
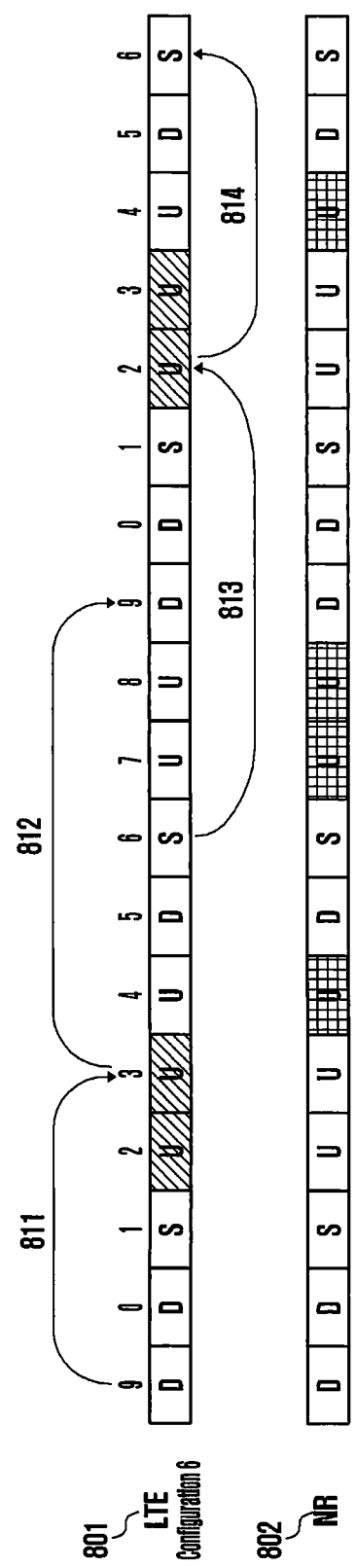
FIG. 8 is a diagram illustrating uplink transmission according to Embodiment 2 of the disclosure.

FIG. 8 is a diagram illustrating uplink transmission according to Embodiment 2 of the disclosure.

In FIG. 8, LTE 801 provides the MCG to the terminal and operates in TDD, and NR 802 provides the SCG to the terminal. Hence, it can be applied when the terminal is configured with EN-DC. In FIG. 8, the TDD cell of LTE 801 is in TDD UL-DL configuration #6, the EN-DC terminal having received this TDD UL-DL configuration #6 from system information may be aware of the positions of the uplink subframe, special subframe, and downlink subframe. The EN-DC terminal may receive information about the position or number of uplink or downlink or flexible slots and OFDM symbols of NR 802 from system information or higher-layer information or a physical layer signal. In FIG. 8, the situation where the EN-DC terminal operates in semi-static power sharing between LTE 801 and NR 802 is considered. That is, it is assumed that the EN-DC terminal receives configuration #4 for LTE uplink transmission among the reference TDD configurations (#2, #4, #5) capable of restricting LTE uplink transmission only in a specific subframe, and the EN-DC terminal does not indicate or report the capability to perform dynamic power sharing to the LTE or NR base station. In this case, it can be seen that the EN-DC terminal may perform LTE uplink transmission only in uplink subframes #2 and #3 coinciding with the uplink subframe according to reference TDD configuration #4 among uplink subframes #2, #3, #4, #7 and #8 of TDD UL-DL configuration #6 of LTE 801 received from system information, and may perform NR uplink transmission in the NR slot coinciding with the time interval of remaining uplink subframes #4, #7 and #8. These results can be determined with reference to Tables 3 and 4 described above.

A further description is given of the case where, as described above, the TDD UL-DL configuration received from the base station of LTE 801 is one of #0 and #6, and the reference TDD configuration received as a higher signal from the LTE base station or the NR base station is one of #2, #4 and #5. In such a case, it is proposed that the EN-DC terminal follows, for uplink data transmission, a UL HARQ timing relationship between PDCCH transmission and PUSCH transmission defined according to a specific second reference TDD configuration, other than the TDD UL-DL configuration given by system information of LTE 801 (refer to Tables 6 and 7). In this case, as uplink subframes for PDCCH reception, PUSCH transmission, and PUSCH retransmission of the EN-DC terminal occur in the same LTE uplink subframes for every radio frame (711, 712, 713, 714), the problem of collision between NR uplink transmission and LTE uplink transmission does not arise when PUSCH retransmission of the EN-DC terminal described above occurs.

The second reference TDD configuration for defining the UL HARQ timing relationship can be proposed as follows.

For example, if the UL-DL configuration from system information is #6 and the reference TDD configuration is one of #2, #4 and #5, the second reference TDD configuration for UL HARQ timing is #1.

For example, if the UL-DL configuration from system information is #0 and the reference TDD configuration is one of #2 and #5, the second reference TDD configuration for UL HARQ timing is #1.

Meanwhile, when the UL-DL configuration from system information is #0 and the reference TDD configuration is #4, if second reference TDD configuration #1 for UL HARQ timing is followed, the PDCCH scheduling the PUSCH in uplink subframe #3 should be transmitted in downlink subframe #9 of the previous radio frame. However, in UL-DL configuration #0, as subframe #9 is for the uplink, there arises a problem that the above PDCCH cannot be transmitted.

Therefore, when the UL-DL configuration from system information is #0 and the reference TDD configuration is #4, the following proposals are possible.

First, although the second reference TDD configuration for UL HARQ timing is #1, the EN-DC terminal does not expect PUSCH scheduling in UL subframe #3 of LTE.

Second, although the second reference TDD configuration for UL HARQ timing in UL subframe #2 is #1, the EN-DC terminal expects that the PDCCH scheduling the PUSCH in UL subframe #3 is transmitted in DL subframe #5 of the previous radio frame.

Third, when the UL-DL configuration from system information is #0, the EN-DC terminal does not expect reference TDD configuration #4. That is, the terminal expects only the case where the reference TDD configuration is set to #2 or #5.

Unlike the above proposals, it is also possible that the EN-DC terminal does not expect that the UL-DL configuration from system information is #0 or #6 from the start. That is, without expecting the same configuration as in the case of Embodiment 2 above, it is also possible that the EN-DC terminal receives one of only TDD UL-DL configurations #1, #2, #3, #4 and #5 from system information and receives one of reference TDD configurations #2, #4 and #5 from a higher signal, and the second reference TDD configuration for UL HARQ timing is defined to be #1 in the standard.

Embodiment 3

A description is given of a case where, in consideration of the situation in which the EN-DC terminal is operating with dynamic power sharing between LTE 601 and NR 602 in FIG. 6, the EN-DC terminal indicates or reports the capability to perform dynamic power sharing to the base station. That is, for the case where LTE uplink transmission and NR uplink transmission of the terminal collide as indicated by 608 in FIG. 6 in the time interval of uplink subframe #2 being restricted to LTE uplink transmission by the reference TDD configuration, or for the case where the sum of the power of LTE uplink transmission and the power of NR uplink transmission is greater than the maximum power value for EN-DC operation, there is provided a method for the EN-DC terminal to solve the above problem through Embodiment 3.

A first method is that the EN-DC terminal performs only LTE uplink transmission and always drops NR uplink transmission. With the above-described method, it is possible to protect the uplink transmission of LTE serving as an MCG, and thus, it is possible to maintain a connection with the MCG and transmit and receive important information necessary for the RRC connection from the MCG.

A second method is that the EN-DC terminal maintains the power of LTE uplink transmission and reduces the power of NR uplink transmission so that the sum of the power of LTE uplink transmission and the power of NR uplink transmission is equal to or less than the maximum power value set for EN-DC operation. With the above-described method, it is possible to maintain a connection with the MCG by protecting the uplink transmission of LTE serving as the MCG, and it is possible to transmit and receive important information necessary for the RRC connection from the MCG and perform NR uplink transmission within the EN-DC maximum power at the same time.

Embodiment 4

A description is given of a case where, in consideration of the situation in which the EN-DC terminal is operating with dynamic power sharing between LTE 601 and NR 602 in FIG. 6, the EN-DC terminal indicates or reports the capability to perform dynamic power sharing to the base station. Here, for the case where LTE uplink transmission and NR uplink transmission of the terminal collide as indicated by 608 in FIG. 6 in the time interval of uplink subframes #3, #4, #7 and #8 except for uplink subframe #2 being restricted to LTE uplink transmission by the reference TDD configuration, or for the case where the sum of the power of LTE uplink transmission and the power of NR uplink transmission is greater than the maximum power value for EN-DC operation, there is provided a method for the EN-DC terminal to solve the above problem through Embodiment 4.

A first method is that the EN-DC terminal performs only LTE uplink transmission and always drops NR uplink transmission With the above-described method, it is possible to protect the uplink transmission of LTE serving as an MCG even in uplink subframes corresponding to a time period other than uplink subframe #2 being limited to LTE uplink transmission by the reference TDD configuration, and thus, it is possible to maintain a connection with the MCG and transmit and receive important information necessary for the RRC connection from the MCG.

A second method is that the EN-DC terminal maintains the power of LTE uplink transmission and reduces the power of NR uplink transmission so that the sum of the power of LTE uplink transmission and the power of NR uplink transmission is equal to or less than the maximum power value set for EN-DC operation. With the above-described method, the uplink transmission of LTE serving as an MCG may be protected even in uplink subframes corresponding to a time period other than uplink subframe #2 being limited to LTE uplink transmission by the reference TDD configuration to thereby maintain the connection with the MCG, and it is possible to transmit and receive important information necessary for the RRC connection from the MCG and perform NR uplink transmission within the EN-DC maximum power at the same time, so that the data transmission/reception throughput of the terminal can be increased.

A third method is that the EN-DC terminal performs only NR uplink transmission and always drops LTE uplink transmission. With the above-described method, the uplink transmission of NR serving as the SCG, rather than the uplink transmission of LTE serving as the MCG, is enabled in uplink subframes corresponding to a time period other than uplink subframe #2 being limited to LTE uplink transmission by the reference TDD configuration to thereby increase the amount of data transmission/reception using NR, so that it is possible to increase the uplink and downlink data throughput of the EN-DC terminal.

As another method, it is possible to mix the above three methods and apply them to the EN-DC terminal. For example, it is possible to apply the first method to specific LTE uplink channel transmission or a specific LTE uplink transmission signal such as uplink transmission being important for RRC connection like physical random access channel (PRACH) transmission, and it is possible to apply the second or third method to a case that does not correspond to the above specific LTE uplink channel transmission or specific LTE uplink transmission signal. Alternatively, it is possible to apply the third method to specific NR uplink channel transmission or a specific NR uplink transmission signal such as important uplink transmission like PRACH transmission, and it is possible to apply the first or second method to a case that does not correspond to the above specific NR uplink channel transmission or specific NR uplink transmission signal.

Figure 9:
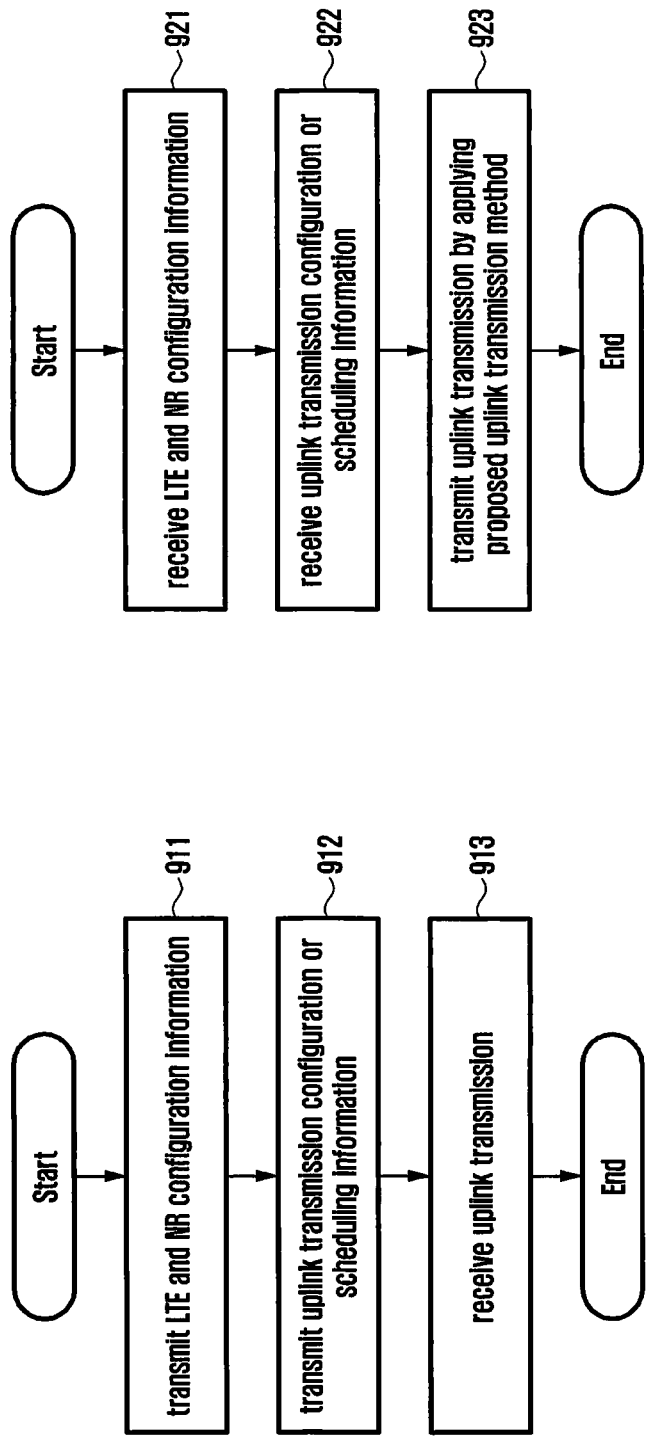
FIG. 9 is a diagram illustrating procedures of a base station and a terminal according to embodiments of the disclosure.

Next, FIG. 9 is a diagram illustrating procedures of a base station and a terminal according to embodiments proposed in the disclosure.

First, the base station procedure will be described.

At step 911, the base station transmits configuration information about individual cells to the terminal through system information or a higher signal. The above configuration information may be cell-related information of MCG or SCG cells required for dual connectivity (TDD or FDD information, uplink/downlink carrier frequency, uplink/downlink frequency band, uplink and/or downlink subcarrier spacing (SCS)), or configuration information necessary for data transmission/reception in the MCG or SCG. Or, it may be configuration information related to various parameters described in the embodiments of the disclosure. The above base station may be an NR base station using NR radio access or an E-UTRA base station using E-UTRA radio access.

At step 912, the base station configures uplink transmission to the terminal according to the embodiments proposed in the disclosure and transmits scheduling information indicating uplink transmission. The base station may be an NR base station using NR radio access or an E-UTRA base station using & UTRA radio access. The uplink transmission configuration may mean uplink tranmission whose transmission is configured by a higher signal configuration without being indicated by the PDCCH such as periodic channel information transmission, and the uplink transmission indicated by the scheduling information may mean uplink transmission that is indicated by the PDCCH and transmitted from the terminal, such as PUSCH transmission or HARQ-ACK transmission. Or, it may be uplink transmission from the terminal such as PRACH or SRS.

At step 913, the base station receives uplink transmission from the terminal according to the embodiments proposed in the disclosure. The base station may be an NR base station using NR radio access or an EUTRA base station using EUTRA radio access.

Next, the terminal procedure will be described.

At step 921, the terminal receives configuration information about individual cells from the base station through system information or a higher signal. The configuration information may be cell-related information of MCG or SCG cells required for dual connectivity (TDD or FDD information, uplink/downlink carrier frequency, uplink/downlink frequency band, uplink and/or downlink subcarrier spacing (SCS)), or configuration information necessary for data transmission/reception in the MCG or SCG. Or, it may be configuration information related to various parameters described in the embodiments of the disclosure. As described in the embodiments of the disclosure, before receiving the dynamic power distribution capability from the base station through a higher signal, the terminal may transmit the capability-related information to the base station. The base station may be an NR base station using NR radio access or an EUTRA base station using E-UTRA radio access.

At step 922, the terminal receives uplink transmission configuration information from the base station according to the embodiments proposed in the disclosure, and receives scheduling information indicating uplink transmission. The base station may be an NR base station using NR radio access or an EUTRA base station using E-UTRA radio access. The uplink transmission configuration information may mean configuration information related to uplink transmission whose transmission is configured by a higher signal configuration without being indicated by the PDCCH such as periodic channel information transmission, and the uplink transmission indicated by the scheduling information may mean uplink transmission that is indicated by the PDCCH and transmitted from the terminal, such as PUSCH transmission or HARQ-ACK transmission. Or, it may be uplink transmission from the terminal such as PRACH or SRS.

At step 923, the terminal transmits an uplink transmission to the base station while controlling the transmission timing and transmission power by using the UL HARQ timing relationship (PDCCH-to-PUSCH transmission, PUSCH-to-PDCCH transmission) according to the embodiments proposed in the disclosure. Controlling the transmission power may include dropping an uplink transmission or reducing the uplink transmission power as described in the embodiments of the disclosure. The base station may be an NR base station using NR radio access or an E-UTRA base station using E-UTRA radio access.

Figure 10:
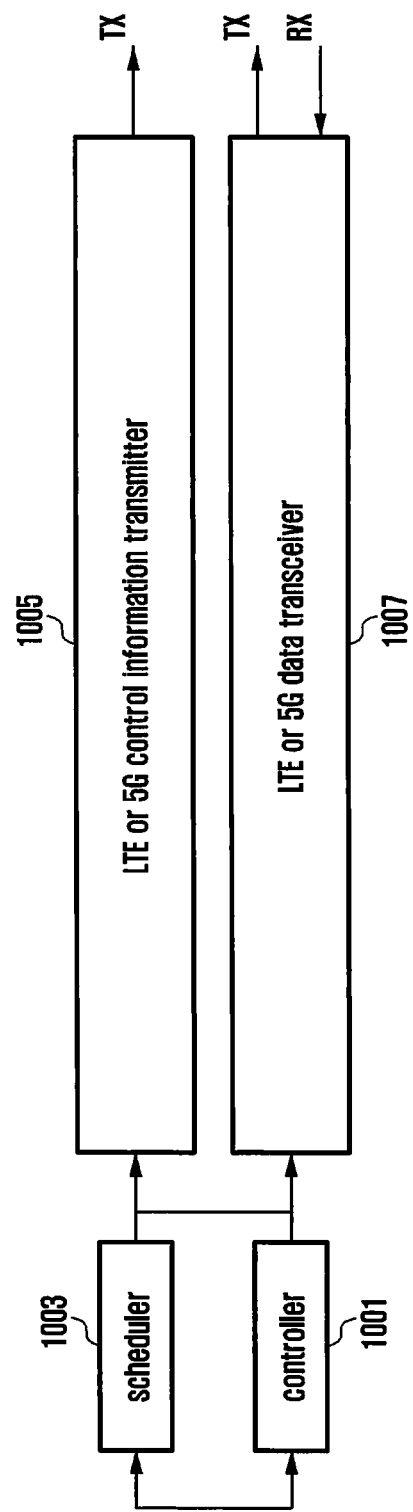
FIG. 10 is a diagram illustrating a base station device according to embodiments of the disclosure.

Next, FIG. 10 is a diagram illustrating a base station device according to embodiments proposed in the disclosure.

The controller 1001 configures necessary information according to the base station procedure of FIG. 9 of the disclosure and embodiments of the disclosure, controls the uplink transmission timing and uplink transmission reception from the terminal according to the disclosure, transmits it to the terminal through the LTE or 5G control information transmitter 1005 and the 5G data transceiver 1007, schedules LTE or 5G data at the scheduler 1003, and transmits and receives LTE or 5G data to and from the terminal through the LTE or 5G data transceiver 1007. In the present base station device, LTE and 5G have been described together for convenience, but the base station device may be an NR base station using NR radio access or an E-UTRA base station using E-UTRA radio access.

Figure 11:
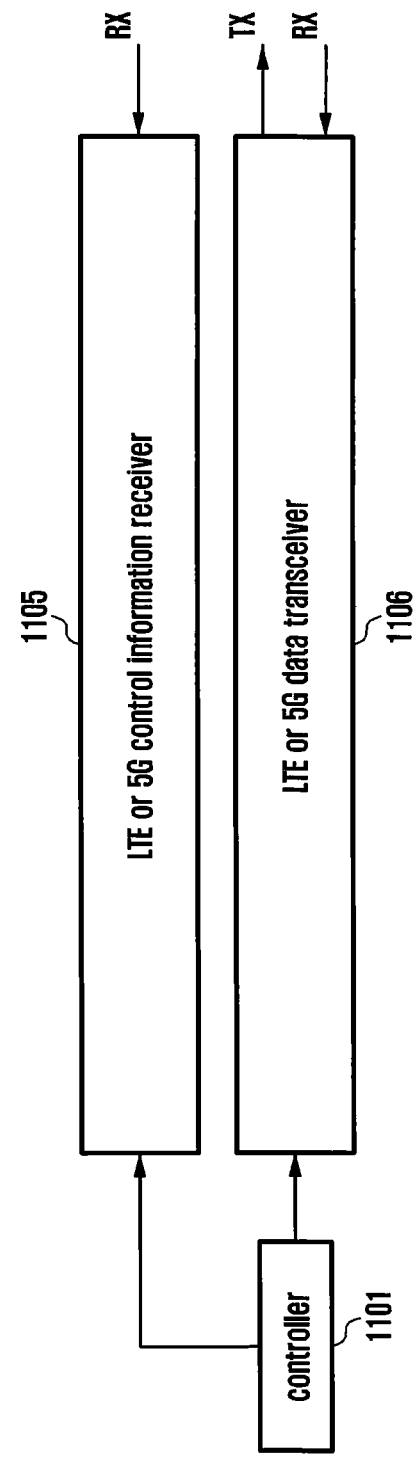
FIG. 11 is a diagram illustrating a terminal device according to embodiments of the disclosure.

Next, FIG. 11 is a diagram illustrating a terminal device according to the disclosure.

The controller 1101 receives necessary configuration information and scheduling from the base station according to the terminal procedure of FIG. 9 of the disclosure and embodiments of the disclosure, controls the uplink transmission timing and uplink transmission power according to the disclosure, and performs uplink transmission set by the base station or indicated by the scheduling. The controller 1101 receives an uplink data channel transmission resource location from the base station or multiplexes uplink control information to an uplink data channel through the LTE or 5G control information receiver 1105 and the LTE or 5G data transceiver 1106, and transmits and receives LTE or 5G data scheduled at the received resource location to and from the LTE or 5G base station through the LTE or 5G data transceiver 1106. In this drawing, for convenience, LTE and 5G devices have been described as being together, but devices for LTE or 5G may be configured separately. The base station transmitting and receiving the above control information and data may be an NR base station using NR radio access or an E-UTRA base station using E-UTRA radio access.

Meanwhile, it is evident that the various embodiments described above may be carried out in combination or association with each other. For example, two or more of Embodiments 1 to 4 may be combined with each other to thereby be carried out, or some or all of a specific embodiment may be combined with some or all of another embodiment to thereby be carried out. Operations according to such a combination or association should also be construed as being included within the scope proposed in the disclosure.

In addition, the embodiments disclosed in the present specification and drawings provide specific examples for easy explanation and understanding of the contents of the disclosure, and are not intended to limit the scope of the disclosure. Therefore, not only the embodiments disclosed herein but also all changes or modified forms derived based on the technical idea of the disclosure should be interpreted as being included in the scope of the disclosure.

The invention claimed is:

1. A method performed by a terminal performing dual connectivity (DC) between a master base station and a secondary base station in a wireless communication system, the method comprising:
   receiving, from the master base station, system information including a time division duplex (TDD) uplink (UL)-downlink (DL) configuration for a primary cell (PCell) associated with a master cell group (MCG) supported by the master base station;

receiving, form the master base station, a radio resource control (RRC) message including a first reference TDD configuration for determining an uplink transmission timing;

determining a second reference TDD configuration based on the TDD UL-DL configuration and the first reference TDD configuration; and transmitting an uplink signal to at least one of the master base station or the secondary base station according to the second reference TDD configuration, wherein in case that the TDD UL-DL configuration is one of configuration #0 and configuration #6 and the first reference TDD configuration is configuration #2, configuration #4 or configuration #5, the second reference TDD configuration is determined to be configuration #1.

2. The method of claim 1, wherein the terminal is configured to operate according to a semi-static power sharing.

3. The method of claim 1, wherein the uplink signal is transmitted to the master base station in a subframe identified according to the second reference TDD configuration, or the uplink signal is transmitted to the secondary base station in a slot identified according to the second reference TDD configuration.

4. A method performed by a master base station supporting a terminal performing dual connectivity (DC) between the master base station and a secondary base station in a wireless communication system, the method comprising:

transmitting, to the terminal, system information including a time division duplex (TDD) uplink (UL)-downlink (DL) configuration for a primary cell (PCell) associated with a master cell group (MCG) supported by the master base station;

transmitting, to the terminal, a radio resource control (RRC) message including a first reference TDD configuration for determining an uplink transmission timing; and receiving an uplink signal from the terminal according to a second reference TDD configuration determined based on the TDD UL-DL configuration and the first reference TDD configuration, wherein in case that the TDD UL-DL configuration is one of configuration #0 and configuration #6 and the first reference TDD configuration is configuration #2, configuration #4 or configuration #5, the second reference TDD configuration is determined to be configuration #1.

5. The method of claim 4, wherein the terminal is configured to operate according to semi-static power sharing.

6. The method of claim 4, wherein:

the uplink signal is received from the terminal in a subframe identified according to the second reference TDD configuration, or the uplink signal is transmitted to the secondary base station in a slot identified according to the second reference TDD configuration.

7. A terminal performing dual connectivity (DC) between a master base station and a secondary base station in a wireless communication system, the terminal comprising:

a transceiver; and a controller coupled with the transceiver and configured to:

receive, from the master base station, system information including a time division duplex (TDD) uplink (UL)-downlink (DL) configuration for a primary cell (PCell) associated with a master cell group (MCG) supported by the master base station, receive, form the master base station, a radio resource control (RRC) message including a first reference TDD configuration for determining an uplink transmission timing, determine a second reference TDD configuration based on the TDD UL-DL configuration and the first reference TDD configuration, and transmit an uplink signal to at least one of the master base station or the secondary base station according to the second reference TDD configuration, wherein in case that the TDD UL-DL configuration is one of configuration #0 and configuration #6 and the first reference TDD configuration is configuration #2, configuration #4 or configuration #5, the second reference TDD configuration is determined to be configuration #1.

8. The terminal of claim 7, wherein the terminal is configured to operate according to a semi-static power sharing.

9. The terminal of claim 7, wherein the uplink signal is transmitted to the master base station in a subframe identified according to the second reference TDD configuration, or the uplink signal is transmitted to the secondary base station in a slot identified according to the second reference TDD configuration.

10. A master base station supporting a terminal performing dual connectivity (DC) between the master base station and a secondary base station in a wireless communication system, the master base station comprising:

a transceiver; and a controller coupled with the transceiver and configured to:

transmit, to the terminal, system information including a time division duplex (TDD) uplink (UL)-downlink (DL) configuration for a primary cell (PCell) associated with a master cell group (MCG) supported by the master base station, transmit, to the terminal, a radio resource control (RRC) message including a first reference TDD configuration for determining an uplink transmission timing, and receive an uplink signal from the terminal according to a second reference TDD configuration determined based on the TDD UL-DL configuration and the first reference TDD configuration, wherein in case that the TDD UL-DL configuration is one of configuration #0 and configuration #6 and the first reference TDD configuration is configuration #2, configuration #4 or configuration #5, the second reference TDD configuration is determined to be configuration #1.

11. The master base station of claim 10, wherein the terminal is configured to operate according to a semi-static power sharing.

12. The master base station of claim 10, wherein the uplink signal is received from the terminal in a subframe identified according to the second reference TDD configuration, or the uplink signal is transmitted to the secondary base station in a slot identified according to the second reference TDD configuration.

* * * * *